(12) United States Patent
Heap et al.

(10) Patent No.: US 8,135,532 B2
(45) Date of Patent: Mar. 13, 2012

(54) METHOD FOR CONTROLLING OUTPUT POWER OF AN ENERGY STORAGE DEVICE IN A POWERTRAIN SYSTEM

(75) Inventors: Anthony H. Heap, Ann Arbor, MI (US); William R. Cawthorne, Milford, MI (US); Wilfried Brunssen, Ypsilanti, MI (US)

(73) Assignees: GM Global Technology Operations LLC, Detroit, MI (US); Daimler AG, Stuttgart (DE); Chrysler LLC, Auburn Hills, MI (US); Bayerische Motoen Werke Aktiengesellschaft, Munich (DE)

( * ) Notice: Subject to any disclaimer, the term of this patent is extended or adjusted under 35 U.S.C. 154(b) by 733 days.

(21) Appl. No.: 12/249,622

(22) Filed: Oct. 10, 2008

(65) Prior Publication Data

US 2009/0118962 A1    May 7, 2009

Related U.S. Application Data

(60) Provisional application No. 60/985,252, filed on Nov. 4, 2007.

(51) Int. Cl.
*G06F 19/00* (2011.01)
*H01M 10/44* (2006.01)
*B60K 6/22* (2007.10)

(52) U.S. Cl. .... 701/99; 701/22; 180/65.265; 180/65.29; 320/132; 320/135

(58) Field of Classification Search ................ 701/1, 22, 701/36, 99; 318/139; 320/132, 134–136; 700/28, 32–34, 36, 40, 286, 297
See application file for complete search history.

(56) References Cited

U.S. PATENT DOCUMENTS

| | | | | |
|---|---|---|---|---|
| 5,834,922 A * | 11/1998 | Ikawa et al. | ................. | 320/136 |
| 5,910,722 A * | 6/1999 | Lyons et al. | ................. | 320/104 |
| 5,929,595 A * | 7/1999 | Lyons et al. | ................. | 320/104 |
| 5,941,328 A * | 8/1999 | Lyons et al. | ................. | 180/65.1 |
| 6,166,523 A * | 12/2000 | Singh et al. | ................. | 320/132 |
| 6,314,346 B1 * | 11/2001 | Kitajima et al. | ................. | 701/22 |
| 6,408,968 B1 * | 6/2002 | Wakashiro et al. | ........ | 180/65.26 |
| 6,424,053 B1 * | 7/2002 | Wakashiro et al. | ......... | 290/40 C |
| 6,441,574 B1 * | 8/2002 | Phillips et al. | ................. | 318/432 |
| 6,449,537 B1 * | 9/2002 | Phillips et al. | ................. | 701/22 |
| 6,702,052 B1 * | 3/2004 | Wakashiro et al. | ........ | 180/65.25 |
| 6,832,148 B1 | 12/2004 | Bennett | | |
| 6,868,318 B1 | 3/2005 | Cawthorne | | |
| 6,886,524 B2 * | 5/2005 | Hanada et al. | ............. | 123/198 F |
| 6,907,948 B2 * | 6/2005 | Wakashiro et al. | ............. | 701/22 |
| 6,991,053 B2 * | 1/2006 | Kuang et al. | ............. | 180/65.235 |
| 7,076,356 B2 * | 7/2006 | Hubbard et al. | ................. | 701/55 |
| 7,117,964 B1 * | 10/2006 | Kuang et al. | ............. | 180/65.22 |
| 7,154,236 B1 | 12/2006 | Heap | | |
| 7,196,493 B2 * | 3/2007 | McGee et al. | ................. | 320/104 |
| 7,200,476 B2 * | 4/2007 | Cawthorne et al. | ............. | 701/51 |
| 7,301,304 B2 * | 11/2007 | Weisgerber et al. | .......... | 320/132 |

(Continued)

*Primary Examiner* — Thomas Black
*Assistant Examiner* — Lindsay M Browder

(57) ABSTRACT

A method for controlling a powertrain system includes monitoring a state-of-charge of the energy storage device and determining a first set of electric power limits and a second set of electric power limits based on the state-of-charge of the energy storage device. The method further includes providing a power range for opportunity charging and discharging of the energy storage device based on the first set of electric power limits. The method further includes providing a power range for controlling output power of the energy storage device based on the second set of electric power limits.

16 Claims, 13 Drawing Sheets

U.S. PATENT DOCUMENTS

| | | | |
|---|---|---|---|
| 7,360,615 B2 * | 4/2008 | Salman et al. | 180/65.265 |
| 7,449,891 B2 * | 11/2008 | Cawthorne | 324/427 |
| 7,567,061 B2 * | 7/2009 | Grand et al. | 320/132 |
| 7,797,089 B2 * | 9/2010 | Kozarekar | 701/22 |
| 7,937,195 B2 * | 5/2011 | Kozarekar | 701/22 |
| 2004/0210356 A1 * | 10/2004 | Wilton et al. | 701/22 |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |
| 2005/0080535 A1 | 4/2005 | Steinmetz | |
| 2005/0080537 A1 | 4/2005 | Cawthorne | |
| 2005/0080538 A1 | 4/2005 | Hubbard | |
| 2005/0080539 A1 | 4/2005 | Hubbard | |
| 2005/0080540 A1 | 4/2005 | Steinmetz | |
| 2005/0080541 A1 | 4/2005 | Sah | |
| 2005/0182526 A1 | 8/2005 | Hubbard | |
| 2005/0182543 A1 | 8/2005 | Sah | |
| 2005/0182546 A1 | 8/2005 | Hsieh | |
| 2005/0182547 A1 | 8/2005 | Sah | |
| 2005/0189918 A1 | 9/2005 | Weisgerber | |
| 2005/0252283 A1 | 11/2005 | Heap | |
| 2005/0252305 A1 | 11/2005 | Hubbard | |
| 2005/0252474 A1 | 11/2005 | Sah | |
| 2005/0255963 A1 | 11/2005 | Hsieh | |
| 2005/0255964 A1 | 11/2005 | Heap | |
| 2005/0255965 A1 | 11/2005 | Tao | |
| 2005/0255966 A1 | 11/2005 | Tao | |
| 2005/0255967 A1 | 11/2005 | Foster | |
| 2005/0255968 A1 | 11/2005 | Sah | |
| 2005/0256617 A1 | 11/2005 | Cawthorne | |
| 2005/0256618 A1 | 11/2005 | Hsieh | |
| 2005/0256623 A1 | 11/2005 | Hubbard | |
| 2005/0256625 A1 | 11/2005 | Sah | |
| 2005/0256626 A1 | 11/2005 | Hsieh | |
| 2005/0256627 A1 | 11/2005 | Sah | |
| 2005/0256629 A1 | 11/2005 | Tao | |
| 2005/0256631 A1 | 11/2005 | Cawthorne | |
| 2005/0256633 A1 | 11/2005 | Heap | |
| 2005/0256919 A1 | 11/2005 | Cawthorne | |
| 2006/0194670 A1 | 8/2006 | Heap | |
| 2007/0078580 A1 | 4/2007 | Cawthorne | |
| 2007/0093953 A1 | 4/2007 | Heap | |
| 2007/0149348 A1 | 6/2007 | Holmes | |
| 2007/0191181 A1 | 8/2007 | Burns | |
| 2007/0225886 A1 | 9/2007 | Morris | |
| 2007/0225887 A1 | 9/2007 | Morris | |
| 2007/0225888 A1 | 9/2007 | Morris | |
| 2007/0225889 A1 | 9/2007 | Morris | |
| 2007/0260381 A1 | 11/2007 | Sah | |
| 2007/0276569 A1 | 11/2007 | Sah | |
| 2007/0284162 A1 | 12/2007 | Zettel | |
| 2007/0284163 A1 | 12/2007 | Heap | |
| 2007/0284176 A1 | 12/2007 | Sah | |
| 2007/0285059 A1 | 12/2007 | Zettel | |
| 2007/0285060 A1 | 12/2007 | Zettel | |
| 2007/0285061 A1 | 12/2007 | Zettel | |
| 2007/0285063 A1 | 12/2007 | Zettel | |
| 2007/0285097 A1 | 12/2007 | Zettel | |
| 2008/0004779 A1 | 1/2008 | Sah | |
| 2008/0028879 A1 | 2/2008 | Robinette | |
| 2008/0032855 A1 | 2/2008 | Sah | |
| 2008/0064559 A1 | 3/2008 | Cawthorne | |
| 2008/0064562 A1 | 3/2008 | Zettel | |
| 2008/0103003 A1 | 5/2008 | Sah | |
| 2008/0119320 A1 | 5/2008 | Wu | |
| 2008/0119321 A1 | 5/2008 | Heap | |
| 2008/0120000 A1 | 5/2008 | Heap | |
| 2008/0120001 A1 | 5/2008 | Heap | |
| 2008/0120002 A1 | 5/2008 | Heap | |
| 2008/0176706 A1 | 7/2008 | Wu | |
| 2008/0176709 A1 | 7/2008 | Wu | |
| 2008/0181280 A1 | 7/2008 | Wang | |
| 2008/0182696 A1 | 7/2008 | Sah | |
| 2008/0183372 A1 | 7/2008 | Snyder | |
| 2008/0234097 A1 | 9/2008 | Sah | |
| 2008/0236921 A1 | 10/2008 | Huseman | |
| 2008/0243346 A1 | 10/2008 | Huseman | |
| 2008/0249745 A1 | 10/2008 | Heap | |
| 2008/0262694 A1 | 10/2008 | Heap | |
| 2008/0262698 A1 | 10/2008 | Lahti | |
| 2008/0272717 A1 | 11/2008 | Gleason | |
| 2008/0275611 A1 | 11/2008 | Snyder | |
| 2008/0275624 A1 | 11/2008 | Snyder | |
| 2008/0275625 A1 | 11/2008 | Snyder | |
| 2008/0287255 A1 | 11/2008 | Snyder | |
| 2009/0069148 A1 | 3/2009 | Heap | |
| 2009/0069989 A1 | 3/2009 | Heap | |
| 2009/0070019 A1 | 3/2009 | Heap | |
| 2009/0082170 A1 | 3/2009 | Heap | |
| 2009/0088294 A1 | 4/2009 | West | |
| 2009/0105039 A1 | 4/2009 | Sah | |
| 2009/0105896 A1 | 4/2009 | Tamai | |
| 2009/0105898 A1 | 4/2009 | Wu | |
| 2009/0105914 A1 | 4/2009 | Buur | |
| 2009/0107745 A1 | 4/2009 | Buur | |
| 2009/0107755 A1 | 4/2009 | Kothari | |
| 2009/0108673 A1 | 4/2009 | Wang | |
| 2009/0111637 A1 | 4/2009 | Day | |
| 2009/0111640 A1 | 4/2009 | Buur | |
| 2009/0111642 A1 | 4/2009 | Sah | |
| 2009/0111643 A1 | 4/2009 | Sah | |
| 2009/0111644 A1 | 4/2009 | Kaminsky | |
| 2009/0111645 A1 | 4/2009 | Heap | |
| 2009/0112385 A1 | 4/2009 | Heap | |
| 2009/0112392 A1 | 4/2009 | Buur | |
| 2009/0112399 A1 | 4/2009 | Buur | |
| 2009/0112412 A1 | 4/2009 | Cawthorne | |
| 2009/0112416 A1 | 4/2009 | Heap | |
| 2009/0112417 A1 | 4/2009 | Kaminsky | |
| 2009/0112418 A1 | 4/2009 | Buur | |
| 2009/0112419 A1 | 4/2009 | Heap | |
| 2009/0112420 A1 | 4/2009 | Buur | |
| 2009/0112421 A1 | 4/2009 | Sah | |
| 2009/0112422 A1 | 4/2009 | Sah | |
| 2009/0112423 A1 | 4/2009 | Foster | |
| 2009/0112427 A1 | 4/2009 | Heap | |
| 2009/0112428 A1 | 4/2009 | Sah | |
| 2009/0112429 A1 | 4/2009 | Sah | |
| 2009/0112495 A1 | 4/2009 | Center | |
| 2009/0115349 A1 | 5/2009 | Heap | |
| 2009/0115350 A1 | 5/2009 | Heap | |
| 2009/0115351 A1 | 5/2009 | Heap | |
| 2009/0115352 A1 | 5/2009 | Heap | |
| 2009/0115353 A1 | 5/2009 | Heap | |
| 2009/0115354 A1 | 5/2009 | Heap | |
| 2009/0115365 A1 | 5/2009 | Heap | |
| 2009/0115373 A1 | 5/2009 | Kokotovich | |
| 2009/0115377 A1 | 5/2009 | Schwenke | |
| 2009/0115408 A1 | 5/2009 | West | |
| 2009/0115491 A1 | 5/2009 | Anwar | |
| 2009/0118074 A1 | 5/2009 | Zettel | |
| 2009/0118075 A1 | 5/2009 | Heap | |
| 2009/0118076 A1 | 5/2009 | Heap | |
| 2009/0118077 A1 | 5/2009 | Hsieh | |
| 2009/0118078 A1 | 5/2009 | Wilmanowicz | |
| 2009/0118079 A1 | 5/2009 | Heap | |
| 2009/0118080 A1 | 5/2009 | Heap | |
| 2009/0118081 A1 | 5/2009 | Heap | |
| 2009/0118082 A1 | 5/2009 | Heap | |
| 2009/0118083 A1 | 5/2009 | Kaminsky | |
| 2009/0118084 A1 | 5/2009 | Heap | |
| 2009/0118085 A1 | 5/2009 | Heap | |
| 2009/0118086 A1 | 5/2009 | Heap | |
| 2009/0118087 A1 | 5/2009 | Hsieh | |
| 2009/0118089 A1 | 5/2009 | Heap | |
| 2009/0118090 A1 | 5/2009 | Heap | |
| 2009/0118091 A1 | 5/2009 | Lahti | |
| 2009/0118093 A1 | 5/2009 | Heap | |
| 2009/0118094 A1 | 5/2009 | Hsieh | |
| 2009/0118877 A1 | 5/2009 | Center | |
| 2009/0118879 A1 | 5/2009 | Heap | |
| 2009/0118880 A1 | 5/2009 | Heap | |
| 2009/0118882 A1 | 5/2009 | Heap | |
| 2009/0118883 A1 | 5/2009 | Heap | |
| 2009/0118884 A1 | 5/2009 | Heap | |

| | | | | | | |
|---|---|---|---|---|---|---|
| 2009/0118885 A1 | 5/2009 | Heap | | 2009/0118936 A1 | 5/2009 | Heap |
| 2009/0118886 A1 | 5/2009 | Tamai | | 2009/0118937 A1 | 5/2009 | Heap |
| 2009/0118887 A1 | 5/2009 | Minarcin | | 2009/0118938 A1 | 5/2009 | Heap |
| 2009/0118888 A1 | 5/2009 | Minarcin | | 2009/0118939 A1 | 5/2009 | Heap |
| 2009/0118901 A1 | 5/2009 | Cawthorne | | 2009/0118940 A1 | 5/2009 | Heap |
| 2009/0118914 A1 | 5/2009 | Schwenke | | 2009/0118941 A1 | 5/2009 | Heap |
| 2009/0118915 A1 | 5/2009 | Heap | | 2009/0118942 A1 | 5/2009 | Hsieh |
| 2009/0118916 A1 | 5/2009 | Kothari | | 2009/0118943 A1 | 5/2009 | Heap |
| 2009/0118917 A1 | 5/2009 | Sah | | 2009/0118944 A1 | 5/2009 | Heap |
| 2009/0118918 A1 | 5/2009 | Heap | | 2009/0118945 A1 | 5/2009 | Heap |
| 2009/0118919 A1 | 5/2009 | Heap | | 2009/0118946 A1 | 5/2009 | Heap |
| 2009/0118920 A1 | 5/2009 | Heap | | 2009/0118947 A1 | 5/2009 | Heap |
| 2009/0118921 A1 | 5/2009 | Heap | | 2009/0118948 A1 | 5/2009 | Heap |
| 2009/0118922 A1 | 5/2009 | Heap | | 2009/0118949 A1 | 5/2009 | Heap |
| 2009/0118923 A1 | 5/2009 | Heap | | 2009/0118950 A1 | 5/2009 | Heap |
| 2009/0118924 A1 | 5/2009 | Heap | | 2009/0118951 A1 | 5/2009 | Heap |
| 2009/0118925 A1 | 5/2009 | Hsieh | | 2009/0118952 A1 | 5/2009 | Heap |
| 2009/0118926 A1 | 5/2009 | Heap | | 2009/0118954 A1 | 5/2009 | Wu |
| 2009/0118927 A1 | 5/2009 | Heap | | 2009/0118957 A1 | 5/2009 | Heap |
| 2009/0118928 A1 | 5/2009 | Heap | | 2009/0118963 A1 | 5/2009 | Heap |
| 2009/0118929 A1 | 5/2009 | Heap | | 2009/0118964 A1 | 5/2009 | Snyder |
| 2009/0118930 A1 | 5/2009 | Heap | | 2009/0118969 A1 | 5/2009 | Heap |
| 2009/0118931 A1 | 5/2009 | Kaminsky | | 2009/0118971 A1 | 5/2009 | Heap |
| 2009/0118932 A1 | 5/2009 | Heap | | 2009/0118999 A1 | 5/2009 | Heap |
| 2009/0118933 A1 | 5/2009 | Heap | | 2009/0144002 A1 | 6/2009 | Zettel |
| 2009/0118934 A1 | 5/2009 | Heap | | | | |
| 2009/0118935 A1 | 5/2009 | Heap | | | | |

\* cited by examiner

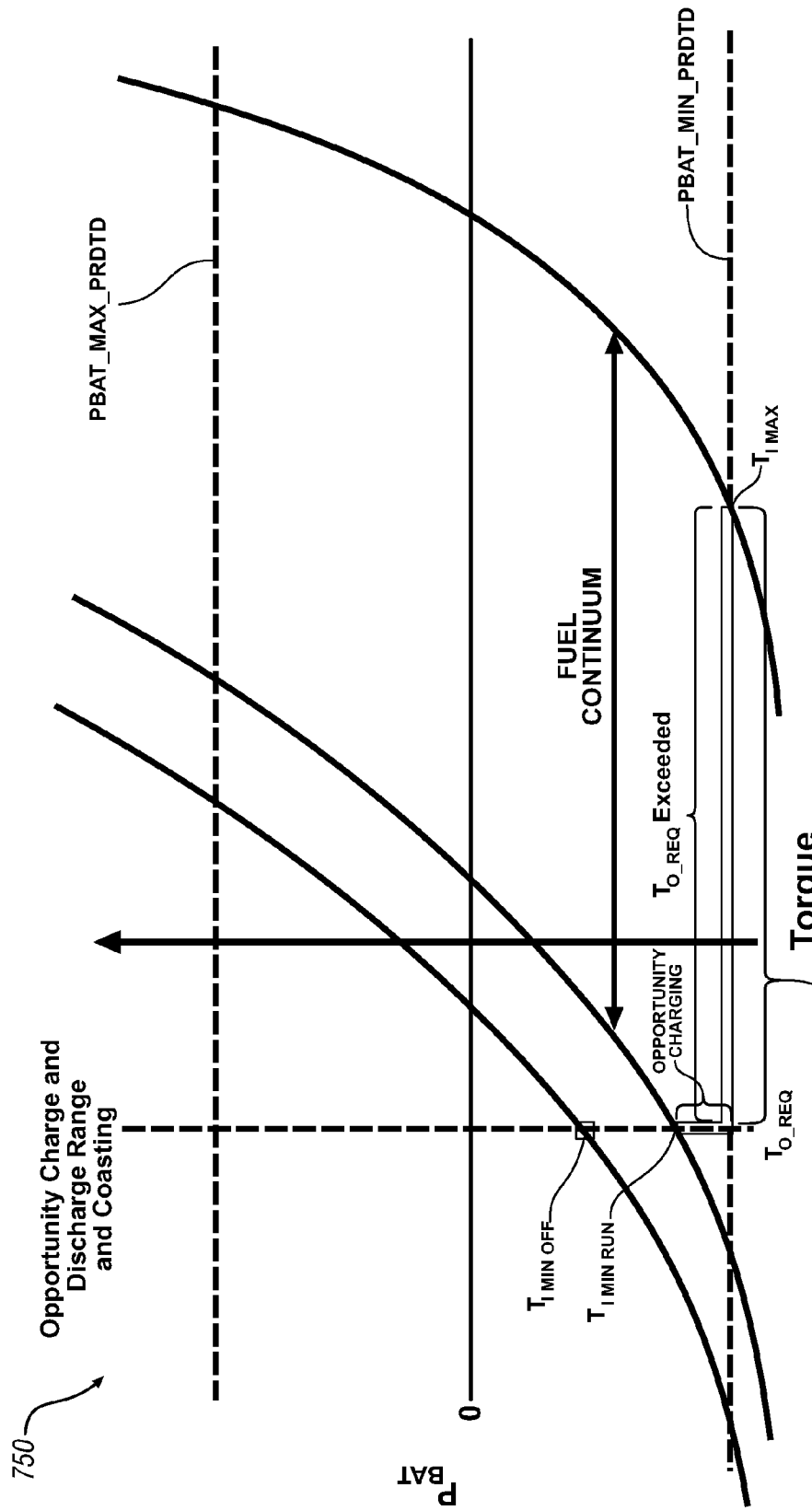

METHOD FOR CONTROLLING OUTPUT POWER OF AN ENERGY STORAGE DEVICE IN A POWERTRAIN SYSTEM

CROSS REFERENCE TO RELATED APPLICATION

This application claims the benefit of U.S. Provisional Application No. 60/985,252 filed on Nov. 4, 2007 which is hereby incorporated herein by reference.

TECHNICAL FIELD

This disclosure is related to managing electric power within powertrain systems.

BACKGROUND

The statements in this section merely provide background information related to the present disclosure and may not constitute prior art.

Known powertrain architectures include torque-generative devices, including internal combustion engines and electric machines, which transmit torque through a transmission device to an output member. One exemplary powertrain includes a two-mode, compound-split, electromechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate a torque input to the transmission, independently of a torque input from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

A powertrain system includes an engine, a torque generating machine, a transmission and an energy storage device connected to the torque generating machine wherein the transmission is operative to transfer power between an output member and the engine and the torque generating machine. A method for controlling the powertrain system includes monitoring an operator torque request and a state-of-charge of the energy storage device. A first set of electric power limits and a second set of electric power limits are determined based on the state-of-charge of the energy storage device. A power range for opportunity charging and discharging of the energy storage device is provided based on the first set of electric power limits. A power range for controlling output power of the energy storage device based on the second set of electric power limits is determined.

BRIEF DESCRIPTION OF THE DRAWINGS

One or more embodiments will now be described, by way of example, with reference to the accompanying drawings, in which.

DETAILED DESCRIPTION

Figure 1:
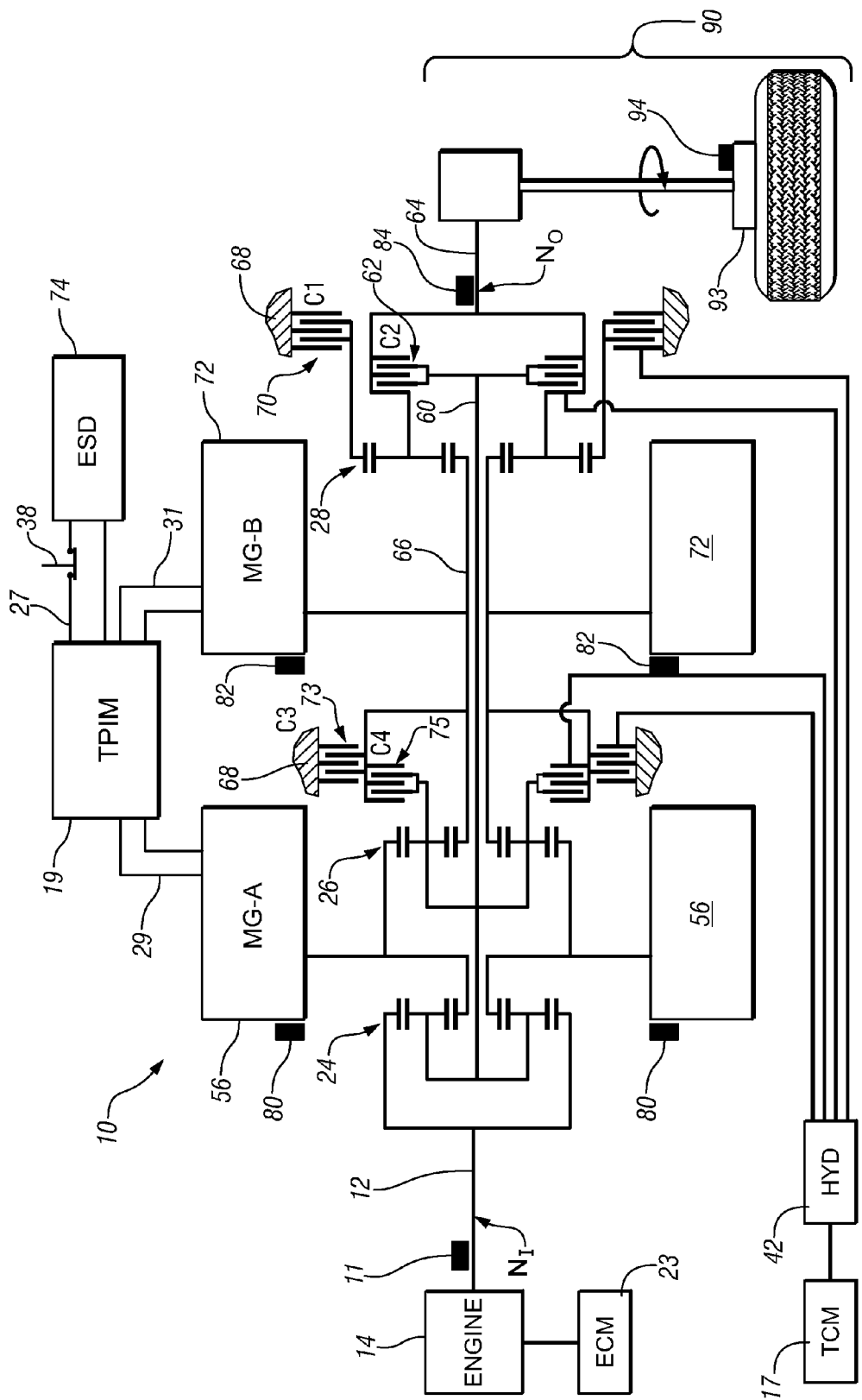
FIG. 1 is a schematic diagram of an exemplary powertrain, in accordance with the present disclosure.
Figure 2:
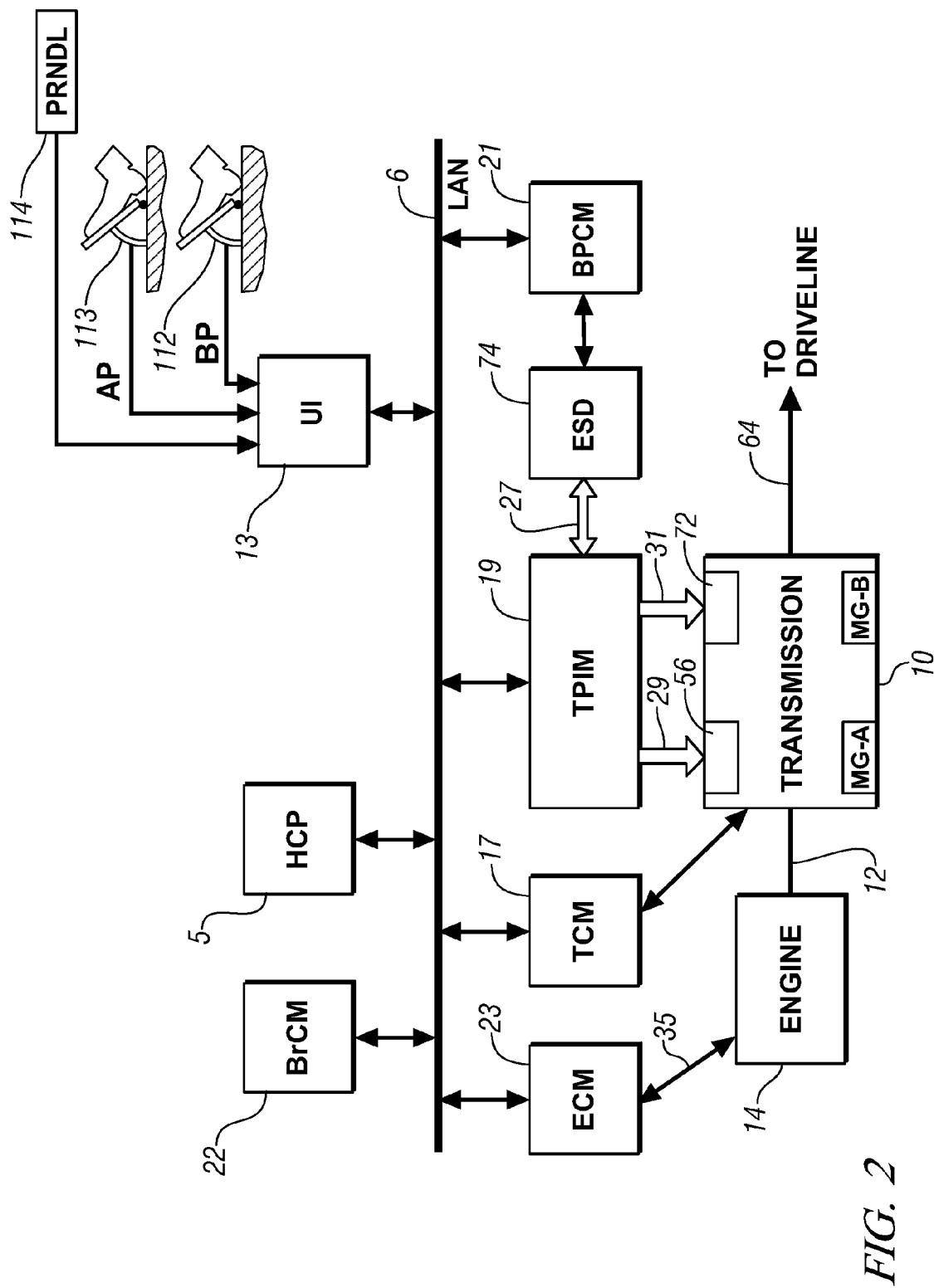
FIG. 2 is a schematic diagram of an exemplary architecture for a control system and powertrain, in accordance with the present disclosure.

Referring now to the drawings, wherein the showings are for the purpose of illustrating certain exemplary embodiments only and not for the purpose of limiting the same, FIGS. 1 and 2 depict an exemplary hybrid powertrain. The exemplary hybrid powertrain in accordance with the present disclosure is depicted in FIG. 1, comprising a two-mode, compound-split, electro-mechanical hybrid transmission 10 operatively connected to an engine 14 and torque machines comprising first and second electric machines ('MG-A') 56 and ('MG-B') 72 in this embodiment. The engine 14 and first and second electric machines 56 and 72 each generate power which can be transferred to the transmission 10. The power generated by the engine 14 and the first and second electric machines 56 and 72 and transferred to the transmission 10 is described in terms of input and motor torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transfer torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and engine torque, can differ from the input speed $N_I$ and the input torque $T_I$ to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transferring devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power to the driveline 90 that is transferred to vehicle wheels 93, one of which is shown in FIG. 1. The output power at the output member 64 is characterized in terms of an output rotational speed $N_O$ and an output torque $T_O$. A transmission output speed sensor 84 monitors rotational speed and rotational direction of the output member 64. Each of the vehicle wheels 93 is preferably equipped with a sensor 94 adapted to monitor wheel speed, $V_{SS\text{-}WHL}$, the output of which is monitored by a control module of a distributed control module system described with respect to FIG. 2, to determine vehicle speed, and absolute and relative wheel speeds for braking control, traction control, and vehicle acceleration management.

The input torque from the engine 14 and the motor torques from the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31 to meet the torque commands for the first and second electric machines 56 and 72 in response to the motor torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary hybrid powertrain described in FIG. 1. The distributed control module system synthesizes pertinent information and inputs, and executes algorithms to control various actuators to meet control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electromechanical hybrid powertrain. The devices include an accelerator pedal 113 ('AP'), an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality including e.g., antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the hybrid powertrain, serving to coordinate operation of the ECM 23, TCM 17, TPIM 19, and BPCM 21. Based upon various input signals from the user interface 13 and the hybrid powertrain, including the ESD 74, the HCP 5 determines an operator torque request, an output torque command, an engine input torque command, clutch torque(s) for the applied torque-transfer clutches C1 70, C2 62, C3 73, C4 75 of the transmission 10, and the motor torques $T_A$ and $T_B$ for the first and second electric machines 56 and 72. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic control circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

A brake control module (hereafter 'BrCM') 22 is operatively connected to friction brakes (not shown) on each of the vehicle wheels 93. The BrCM 22 monitors the operator input to the brake pedal 112 and generates control signals to control the friction brakes and sends a control signal to the HCP 5 to operate the first and second electric machines 56 and 72 based thereon.

Each of the control modules ECM 23, TCM 17, TPIM 19, BPCM 21, and BrCM 22 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

The exemplary hybrid powertrain selectively operates in one of several operating range states that can be described in terms of an engine state comprising one of an engine-on state ('ON') and an engine-off state ('OFF'), and a transmission state comprising a plurality of fixed gears and continuously variable operating modes, described with reference to Table 1, below.

TABLE 1

| Description | Engine State | Transmission Operating Range State | Applied Clutches | |
|---|---|---|---|---|
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode 1, or M1, is selected by applying clutch C1 70 only in order to "ground" the outer gear member of the third planetary gear set 28. The engine state can be one of ON ('M1_Eng_On') or OFF ('M1_Eng_Off'). A second continuously variable mode, i.e., EVT Mode 2, or M2, is selected by applying clutch C2 62 only to connect the shaft 60 to the carrier of the third planetary gear set 28. The engine state can be one of ON ('M2_Eng_On') or OFF ('M2_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$. A first fixed gear operation ('G1') is selected by applying clutches C1 70 and C4 75. A second fixed gear operation ('G2') is selected by applying clutches C1 70 and C2 62. A third fixed gear operation ('G3') is selected by applying clutches C2 62 and C4 75. A fourth fixed gear operation ('G4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine torque commands to control the torque generative devices comprising the engine 14 and first and second electric machines 56 and 72 to meet the operator torque request at the output member 64 and transferred to the driveline 90. Based upon input signals from the user interface 13 and the hybrid powertrain including the ESD 74, the HCP 5 determines the operator torque request, a commanded output torque from the transmission 10 to the driveline 90, an input torque from the engine 14, clutch torques for the torque-transfer clutches C1 70, C2 62, C3 73, C4 75 of the transmission 10; and the motor torques for the first and second electric machines 56 and 72, respectively, as is described hereinbelow.

Final vehicle acceleration can be affected by other factors including, e.g., road load, road grade, and vehicle mass. The operating range state is determined for the transmission 10 based upon a variety of operating characteristics of the hybrid powertrain. This includes the operator torque request communicated through the accelerator pedal 113 and brake pedal 112 to the user interface 13 as previously described. The operating range state may be predicated on a hybrid powertrain torque demand caused by a command to operate the first and second electric machines 56 and 72 in an electrical energy generating mode or in a torque generating mode. The operating range state can be determined by an optimization algorithm or routine which determines optimum system efficiency based upon operator demand for power, battery state-of-charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required in response to the desired output torque at output member 64 to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transfer power therebetween to generate a power flow to the output member 64.

Figure 3:
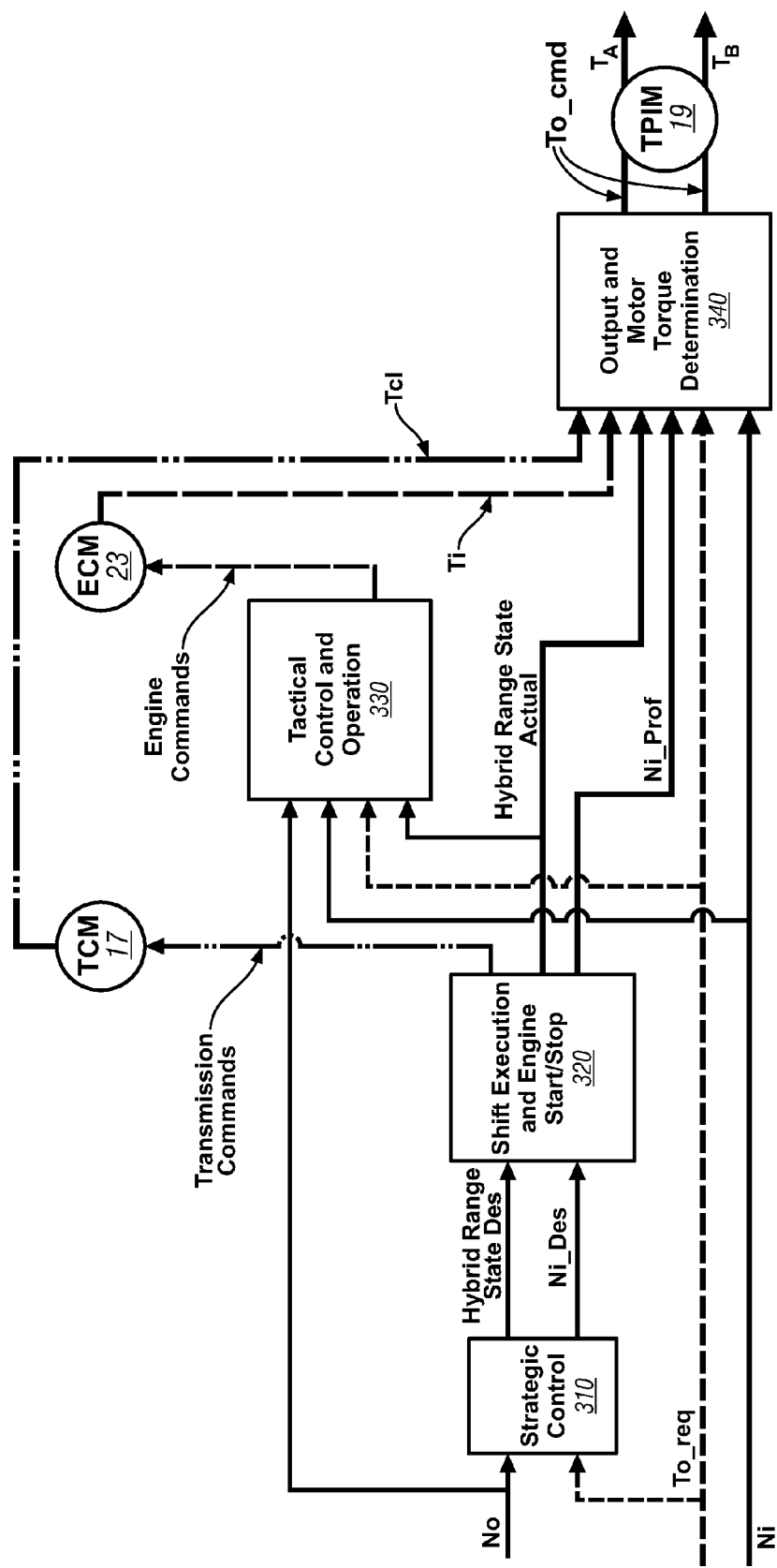
FIGS. 3 and 4 are schematic flow diagrams of a control system architecture for controlling and managing torque in a powertrain system, in accordance with the present disclosure.
Figure 4:
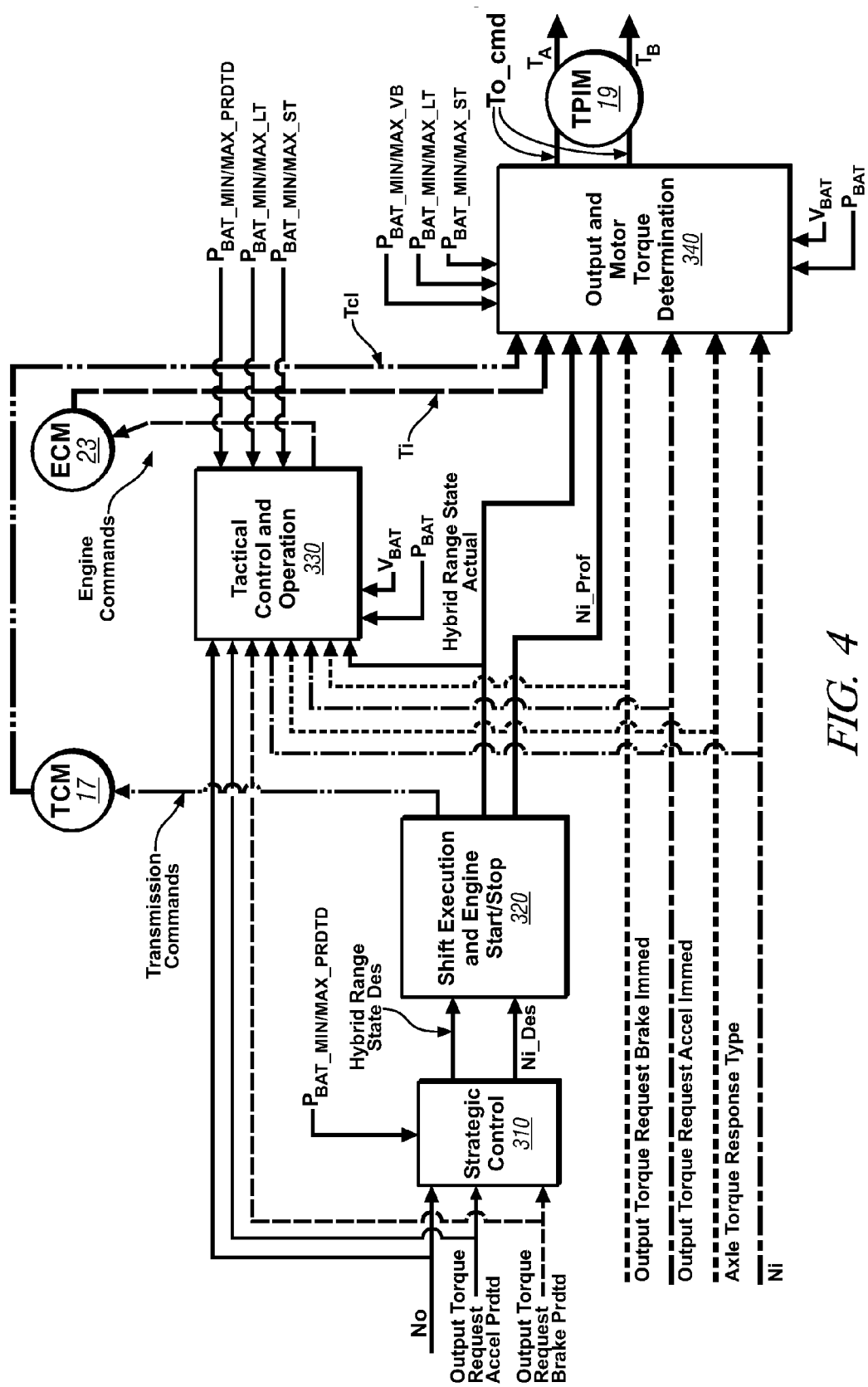

FIGS. 3 and 4 show a control system architecture for controlling and managing torque and power flow in a powertrain system having multiple torque generative devices, described hereinbelow with reference to the hybrid powertrain system shown in FIGS. 1 and 2, and residing in the aforementioned control modules in the form of executable algorithms and calibrations. The control system architecture can be applied to any powertrain system having multiple torque generative devices, including, e.g., a hybrid powertrain system having a single electric machine, a hybrid powertrain system having multiple electric machines, and non-hybrid powertrain systems.

The control system architecture of FIGS. 3 and 4 depicts a flow of pertinent signals through the control modules. In operation, the operator inputs to the accelerator pedal 113 and the brake pedal 112 are monitored to determine the operator torque request ('To_req'). Operation of the engine 14 and the transmission 10 are monitored to determine the input speed ('Ni') and the output speed ('No'). A strategic optimization control scheme ('Strategic Control') 310 determines a preferred input speed ('Ni_Des') and a preferred engine state and transmission operating range state ('Hybrid Range State Des') based upon the output speed and the operator torque request, and optimized based upon other operating parameters of the hybrid powertrain, including battery power limits and response limits of the engine 14, the transmission 10, and the first and second electric machines 56 and 72. The strategic optimization control scheme 310 is preferably executed by the HCP 5 during each 100 ms loop cycle and each 25 ms loop cycle.

The outputs of the strategic optimization control scheme 310 are used in a shift execution and engine start/stop control scheme ('Shift Execution and Engine Start/Stop') 320 to command changes in the transmission operation ('Transmission Commands') including changing the operating range state. This includes commanding execution of a change in the operating range state if the preferred operating range state is different from the present operating range state by commanding changes in application of one or more of the clutches C1 70, C2 62, C3 73, and C4 75 and other transmission commands. The present operating range state ('Hybrid Range State Actual') and an input speed profile ('Ni_Prof') can be determined. The input speed profile is an estimate of an upcoming input speed and preferably comprises a scalar parametric value that is a targeted input speed for the forthcoming loop cycle. The engine operating commands and torque request are based upon the input speed profile during a transition in the operating range state of the transmission.

A tactical control scheme ('Tactical Control and Operation') 330 is repeatedly executed during one of the control loop cycles to determine engine commands ('Engine Commands') for operating the engine, including a preferred input torque from the engine 14 to the transmission 10 based upon the output speed, the input speed, and the operator torque request and the present operating range state for the transmission. The engine commands also include engine states including one of an all-cylinder operating state and a cylinder deactivation operating state wherein a portion of the engine cylinders are deactivated and unfueled, and engine states including one of a fueled state and a fuel cutoff state.

A clutch torque ('Tcl') for each clutch is estimated in the TCM 17, including the presently applied clutches and the non-applied clutches, and a present engine input torque ('Ti') reacting with the input member 12 is determined in the ECM 23. A output and motor torque determination scheme ('Output and Motor Torque Determination') 340 is executed to determine the preferred output torque from the powertrain ('To_cmd'), which includes motor torque commands ('$T_A$', '$T_B$') for controlling the first and second electric machines 56 and 72 in this embodiment. The preferred output torque is based upon the estimated clutch torque(s) for each of the clutches, the present input torque from the engine 14, the present operating range state, the input speed, the operator torque request, and the input speed profile. The first and second electric machines 56 and 72 are controlled through the TPIM 19 to meet the preferred motor torque commands based upon the preferred output torque. The output and motor torque determination scheme 340 includes algorithmic code which is regularly executed during the 6.25 ms and 12.5 ms loop cycles to determine the preferred motor torque commands.

FIG. 4 details the system for controlling and managing the output torque in the hybrid powertrain system, described with reference to the hybrid powertrain system of FIGS. 1 and 2 and the control system architecture of FIG. 3. The hybrid powertrain is controlled to transfer the output torque to the output member 64 and thence to the driveline 90 to generate tractive torque at wheel(s) 93 to forwardly propel the vehicle in response to the operator input to the accelerator pedal 113 when the operator selected position of the transmission gear selector 114 commands operation of the vehicle in the forward direction. Preferably, forwardly propelling the vehicle results in vehicle forward acceleration so long as the output torque is sufficient to overcome external loads on the vehicle, e.g., due to road grade, aerodynamic loads, and other loads.

The BrCM 22 commands the friction brakes on the wheels 93 to apply braking force and generates a command for the transmission 10 to create a negative output torque which reacts with the driveline 90 in response to a net operator input to the brake pedal 112 and the accelerator pedal 113. Preferably the applied braking force and the negative output torque can decelerate and stop the vehicle so long as they are sufficient to overcome vehicle kinetic power at wheel(s) 93. The negative output torque reacts with the driveline 90, thus transferring torque to the electro-mechanical transmission 10 and the engine 14. The negative output torque reacted through the electro-mechanical transmission 10 can be transferred to the first and second electric machines 56 and 72 to generate electric power for storage in the ESD 74.

The operator inputs to the accelerator pedal 113 and the brake pedal 112 comprise individually determinable operator torque request inputs including an immediate accelerator output torque request ('Output Torque Request Accel Immed'), a predicted accelerator output torque request ('Output Torque Request Accel Prdtd'), an immediate brake output torque request ('Output Torque Request Brake Immed'), a predicted brake output torque request ('Output Torque Request Brake Prdtd') and an axle torque response type ('Axle Torque Response Type'). As used herein, the term 'accelerator' refers to an operator request for forward propulsion preferably resulting in increasing vehicle speed over the present vehicle speed, when the operator selected position of the transmission gear selector 114 commands operation of the vehicle in the forward direction. The terms 'deceleration' and 'brake' refer to an operator request preferably resulting in decreasing vehicle speed from the present vehicle speed. The immediate accelerator output torque request, the predicted accelerator output torque request, the immediate brake output torque request, the predicted brake output torque request, and the axle torque response type are individual inputs to the control system shown in FIG. 4.

The immediate accelerator output torque request is determined based upon a presently occurring operator input to the accelerator pedal 113, and comprises a request to generate an immediate output torque at the output member 64 preferably to accelerate the vehicle. The immediate accelerator output torque request is unshaped, but can be shaped by events that affect vehicle operation outside the powertrain control. Such events include vehicle level interruptions in the powertrain control for antilock braking, traction control and vehicle stability control, which can be used to unshape or rate-limit the immediate accelerator output torque request.

The predicted accelerator output torque request is determined based upon the operator input to the accelerator pedal 113 and comprises an optimum or preferred output torque at the output member 64. The predicted accelerator output torque request is preferably equal to the immediate accelerator output torque request during normal operating conditions, e.g., when any one of antilock braking, traction control, or vehicle stability is not being commanded. When any one of antilock braking, traction control or vehicle stability is being commanded the predicted accelerator output torque request remains the preferred output torque with the immediate accelerator output torque request being decreased in response to output torque commands related to the antilock braking, traction control, or vehicle stability control.

Blended brake torque includes a combination of the friction braking torque generated at the wheels 93 and the output torque generated at the output member 64 which reacts with the driveline 90 to decelerate the vehicle in response to the operator input to the brake pedal 112.

The immediate brake output torque request is determined based upon a presently occurring operator input to the brake pedal 112, and comprises a request to generate an immediate output torque at the output member 64 to effect a reactive torque with the driveline 90 which preferably decelerates the vehicle. The immediate brake output torque request is determined based upon the operator input to the brake pedal 112 and the control signal to control the friction brakes to generate friction braking torque.

The predicted brake output torque request comprises an optimum or preferred brake output torque at the output member 64 in response to an operator input to the brake pedal 112 subject to a maximum brake output torque generated at the output member 64 allowable regardless of the operator input to the brake pedal 112. In one embodiment the maximum brake output torque generated at the output member 64 is limited to −0.2 g. The predicted brake output torque request can be phased out to zero when vehicle speed approaches zero regardless of the operator input to the brake pedal 112. As desired by a user, there can be operating conditions under which the predicted brake output torque request is set to zero, e.g., when the operator setting to the transmission gear selector 114 is set to a reverse gear, and when a transfer case (not shown) is set to a four-wheel drive low range. The operating conditions whereat the predicted brake output torque request is set to zero are those in which blended braking is not preferred due to vehicle operating factors.

The axle torque response type comprises an input state for shaping and rate-limiting the output torque response through the first and second electric machines 56 and 72. The input state for the axle torque response type can be an active state, preferably comprising one of a pleasability limited state a maximum range state, and an inactive state. When the commanded axle torque response type is the active state, the output torque command is the immediate output torque. Preferably the torque response for this response type is as fast as possible.

The predicted accelerator output torque request and the predicted brake output torque request are input to the strategic optimization control scheme ('Strategic Control') 310. The strategic optimization control scheme 310 determines a desired operating range state for the transmission 10 ('Hybrid Range State Des') and a desired input speed from the engine 14 to the transmission 10 ('Ni Des'), which comprise inputs to the shift execution and engine operating state control scheme ('Shift Execution and Engine Start/Stop') 320.

A change in the input torque from the engine 14 which reacts with the input member from the transmission 10 can be effected by changing mass of intake air to the engine 14 by controlling position of an engine throttle utilizing an electronic throttle control system (not shown), including opening the engine throttle to increase engine torque and closing the engine throttle to decrease engine torque. Changes in the input torque from the engine 14 can be effected by adjusting ignition timing, including retarding spark timing from a mean-best-torque spark timing to decrease engine torque. The engine state can be changed between the engine-off state and the engine-on state to effect a change in the input torque. The engine state can be changed between the all-cylinder operating state and the cylinder deactivation operating state, wherein a portion of the engine cylinders are unfueled. The engine state can be changed by selectively operating the engine 14 in one of the fueled state and the fuel cutoff state wherein the engine is rotating and unfueled. Executing a shift in the transmission 10 from a first operating range state to a second operating range state can be commanded and achieved by selectively applying and deactivating the clutches C1 70, C2 62, C3 73, and C4 75.

The immediate accelerator output torque request, the predicted accelerator output torque request, the immediate brake output torque request, the predicted brake output torque request, and the axle torque response type are inputs to the tactical control and operation scheme 330 to determine the engine command comprising the preferred input torque to the engine 14.

The tactical control and operation scheme 330 can be divided into two parts. This includes determining a desired engine torque, and therefore a power split between the engine 14 and the first and second electric machines 56 and 72, and controlling the engine states and operation of the engine 14 to meet the desired engine torque. The engine states include the all-cylinder state and the cylinder deactivation state, and a fueled state and a deceleration fuel cutoff state for the present operating range state and the present engine speed, and the engine-off state and the engine-on state. The tactical control and operation scheme 330 monitors the predicted accelerator output torque request and the predicted brake output torque request to determine the predicted input torque request. The immediate accelerator output torque request and the immediate brake output torque request are used to control the engine speed/load operating point to respond to operator inputs to the accelerator pedal 113 and the brake pedal 112, e.g., to determine the engine command comprising the preferred input torque to the engine 14. Preferably, a rapid change in the preferred input torque to the engine 14 occurs only when the first and second electric machines 56 and 72 cannot meet the operator torque request.

The immediate accelerator output torque request, the immediate brake output torque request, and the axle torque response type are input to the motor torque control scheme ('Output and Motor Torque Determination') 340. The motor torque control scheme 340 executes to determine the motor torque commands during each iteration of one of the loop cycles, preferably the 6.25 ms loop cycle.

The present input torque ('Ti') from the engine 14 and the estimated applied clutch torque(s) ('Tcl') are input to the motor torque control scheme 340. The axle torque response type signal determines the torque response characteristics of the output torque command delivered to the output member 64 and hence to the driveline 90.

The motor torque control scheme 340 controls motor torque commands of the first and second electric machines 56 and 72 to transfer a net commanded output torque to the output member 64 of the transmission 10 that meets the operator torque request.

The control system architecture controls power flow among power actuators within a hybrid powertrain. The hybrid powertrain utilizes two or more power actuators to provide output power to an output member. Controlling power flow among the power actuators includes controlling the input speed $N_I$ from the engine 14, the input torque $T_I$ from the engine, and the motor torques $T_A$, $T_B$ of the first and second electric machines 56, 72. Although in the exemplary embodiment described herein above, the hybrid powertrain utilizes the control system architecture to control power flow among power actuators including the engine 14, the ESD 74 and the first and second electric machines 56 and 72, in alternate embodiments the control system architecture can control power flow among other types of power actuators. Exemplary power actuators that can be utilized include fuel cells, ultra-capacitors and hydraulic actuators.

The control system architecture manages electric power within the exemplary powertrain system utilizing electric power limits. The control system architecture utilizes a method for managing electric power within the powertrain system that includes establishing predicted electric power limits, long-term electric power limits, short-term electric power limits, and voltage-based electric power limits. The method further includes determining a preferred input speed from the engine 14, a preferred input torque from the engine 14, a preferred engine state, and a preferred operating range state of the transmission 10 utilizing the predicted electric power limits. The method further includes determining input torque constraints for constraining input torque from the engine 14 and output torque constraints for constraining output torque $T_O$ to the output member 64 based upon the long-term electric power limits and the short-term electric power limits. By constraining the output torque $T_O$, a total motor torque $T_M$, consisting of first and second motor torques $T_A$ and $T_B$ of the first and second electric machines, respectively, is also constrained based on the set of output torque constraints and the input torque $T_I$ from the engine 14. In an alternate embodiment, a set of total motor torque constraints can be determined based upon the long-term electric power limits and short-term electric power limits, in addition to, or instead of the set of output torque constraints. The method further includes determining output torque constraints based upon the voltage-based electric power limits.

The predicted electric power limits comprise preferred battery output levels associated with preferred ESD 74 performance levels, that is, the predicted electric power limits prescribe the desired operating envelope of the ESD 74. The predicted electric power limits comprise a range of battery output power levels from a minimum predicted electric power limit ('$P_{BAT\_MIN\_PRDTD}$') to a maximum predicted electric power limit ('$P_{BAT\_MAX\_PRDTD}$'). The predicted electric power limits typically comprise a more constrained range of battery output power levels than the long-term electric power limits and the short-term electric power limits.

The long-term electric power limits comprise battery output power levels associated with operation of the ESD 74 while maintaining long-term durability of the ESD 74. Operation of the ESD 74 outside the long-term electric power limits for extended periods of time may reduce the operational life of the ESD 74. In one embodiment, the ESD 74 is maintained within the long-term electric power limits during steady-state operation, that is, operation not associated with transient operation. Exemplary transient operations includes tip-in and tip-out of the accelerator pedal 113, wherein transient acceleration operation is requested. Maintaining the ESD 74 within the long-term electric power limits, allows the ESD 74 to provide functionality such as delivering a highest power level that does not degrade operational life of the ESD 74. The long-term electric power limits comprise a range of battery output power levels from a minimum long-term power limit ('$P_{BAT\_MIN\_LT}$') to a maximum long-term electric power limit ('$P_{BAT\_MAX\_LT}$'). The long-term electric power limits typically comprise a more constrained range of battery output power levels than the short-term electric power limits.

The short-term electric power limits comprise ESD 74 output power levels associated with battery operation that does not significantly affect short-term battery durability. Operation of the ESD 74 outside the short-term electric power limits may reduce the operational life of the ESD 74. Operating the ESD 74 within the short-term electric power limits, but outside the long-term electric power limits for short periods of time, may minimally reduce the operational life of the ESD 74, however, does not result in large amounts of degraded operational performance to the ESD 74. In one embodiment, the ESD 74 is maintained within the short-term electric power limits during transient operation. The short-term electric power limits comprise a range of battery output power levels from a minimum short-term electric power limit ('$P_{BAT\_MIN\_ST}$') to a maximum short-term electric power limit ('$P_{BAT\_MAX\_ST}$').

The voltage-based electric power limits comprise a range of battery output power level from a minimum voltage-based electric power limit ('$P_{BAT\_MAX\_VB}$') to a maximum voltage-based electric power limit ('$P_{BAT\_MAX\_VB}$') based on desired operating voltages of the ESD 74. The minimum voltage-based electric power limit $P_{BAT\_MIN\_VB}$ is a minimum amount of battery output power that the ESD 74 outputs before reaching a maximum voltage $V_{LID}$. The maximum voltage-based electric power limit $P_{BAT\_MAX\_VB}$ is an estimated amount battery output power that the ESD 74 can output before reaching a minimum voltage $V_{FLOOR}$. The minimum voltage $V_{FLOOR}$ is a minimum permissible voltage for operating the battery without significantly effecting short-term battery durability. Outputting power from the ESD 74 when the voltage levels of the ESD 74 are below the minimum $V_{FLOOR}$ can cause degraded operational life of the ESD 74.

The strategic optimization control scheme 310 utilizes the predicted electric power limits in an optimization function to determine the preferred input speed and transmission operating range state based on the predicted electric power limits and on the operator torque request. The tactical control scheme 330 utilizes the predicted electric power limits in an optimization function to determine the preferred input torque and preferred engine state from the engine 14 based upon the operator torque request and the predicted electric power limits. The optimization functions of the optimization control scheme 310 and the tactical control scheme 330 determine preferred operating points (that is, preferred input speed, preferred input torque, preferred engine state and transmission operating range state) by determining operating points associated with lowest costs. The predicted electric power limits are utilized in the cost functions of the strategic optimization control scheme 310 and the tactical control scheme 330 to determine costs for operating the engine at selected operating point. The optimization functions further rely on system models and estimates of the operating characteristics of components of the powertrain system to determine costs.

The tactical control scheme 330 determines a set of tactical control electric power constraints based on the short-term electric power limits and the long-term electric power limits. In particular, the tactical control scheme 330 sets the tactical control electric power constraints to the long-term electric power limits, when the battery output power $P_{BAT}$ of the ESD 74 is within a preferred tactical control battery output power operating range, wherein the preferred tactical control battery output power operating range is defined based upon the short-term electric power limits. When the battery output power $P_{BAT}$ is outside the preferred tactical control battery output power operating range, the tactical control scheme 330 utilizes feedback control based on the battery output power $P_{BAT}$ and the short-term electric power limits to modify the tactical control electric power constraints to control battery output power $P_{BAT}$ within the preferred tactical control battery output power operating range.

The set of tactical control electric power constraints are utilized to determine a set of input torque constraints for the tactical control scheme 330. When the preferred input torque as determined by the optimization function is within the set of input torque constraints, the tactical control scheme 330 requests the preferred input torque from the engine 14, and the engine 14 adjusts the position of the engine throttle to control the input torque $T_I$ to the preferred input torque. When the preferred input torque is outside the set of input torque constraints, the tactical control scheme requests the violated constraint for input torque from the engine 14, and the engine 14 adjusts combustion timing to control input torque within the input torque constraints.

The output and motor torque determination scheme 340 determines a set of output and motor torque determination electric power constraints based on the short-term electric power limits and the long-term electric power limits. In particular, the output and motor torque determination scheme 340 sets the output and motor torque determination electric power constraints to the long-term electric power limits, when the battery output power $P_{BAT}$ of the ESD 74 is within a preferred output and motor torque determination battery output power operating range, wherein the preferred output and motor torque determination battery output power operating range is defined based upon the short-term electric power limits. When the battery output power $P_{BAT}$ is outside the preferred output and motor torque determination battery output power operating range, the output and motor torque determination scheme 340 utilizes feedback control based on the battery output power $P_{BAT}$ and the short-term electric power limits to modify the output and motor torque determination electric power constraints to control battery output power $P_{BAT}$ within the preferred output and motor torque determination battery output power operating range.

The set of output and motor torque determination electric power constraints are utilized to determine a set of output torque constraints for the output and motor torque determination scheme 340. When a preferred output torque of the output and motor torque determination scheme is within the set of output torque constraints, the output and motor torque determination scheme 340 requests the requests motor torques from the first and second electric machines 56 and 72 to meet the preferred output torque. When the preferred output torque of the output and motor torque determination scheme 340 is not within the set of output torque constraints, the output and motor torque determination scheme 340 requests torque from the first and second electric machines 56 and 72 to meet the violated constraint for motor torque.

The control system monitors a duration of time that the battery output power $P_{BAT}$ exceeds the long-term electric power limits. If the battery output power exceeds the long-term electric power limit for longer than a predetermined time period, the control system sets the long-term electric power limits to the short-term electric power limits.

Battery output power $P_{BAT}$ is controlled below the maximum voltage-based electric power limit and above the minimum voltage-based electric power limit. The output and motor torque determination scheme 340 utilizes the maximum and minimum voltage-based electric power limit to determine maximum motor torques of the first and second electric machines 56 and 72. The output and motor torque determination scheme 340 and the shift execution and engine start/stop control scheme 320 utilizes the maximum motor torques to determine an engine start profile for starting the engine such that the maximum motor torques will not be exceeded during engine starting. For example, if the maximum voltage-based electric power limit is above a threshold power level, an aggressive starting profile having higher battery output power $P_{BAT}$ is utilized. If the maximum voltage-based electric power limit is below the threshold power level, a starting profile having lower battery output power $P_{BAT}$ is utilized. Further, if during starting the battery output power $P_{BAT}$ exceeds the maximum voltage-based electric power limit, the start profile is altered to maintain the battery output power $P_{BAT}$ under the maximum voltage-based electric power limits. The maximum voltage-based electric power limit can be further utilized in the output and motor torque determination scheme 340 to allow the powertrain system to take advantage of increased battery power available during engine starting conditions.

Figure 5A:
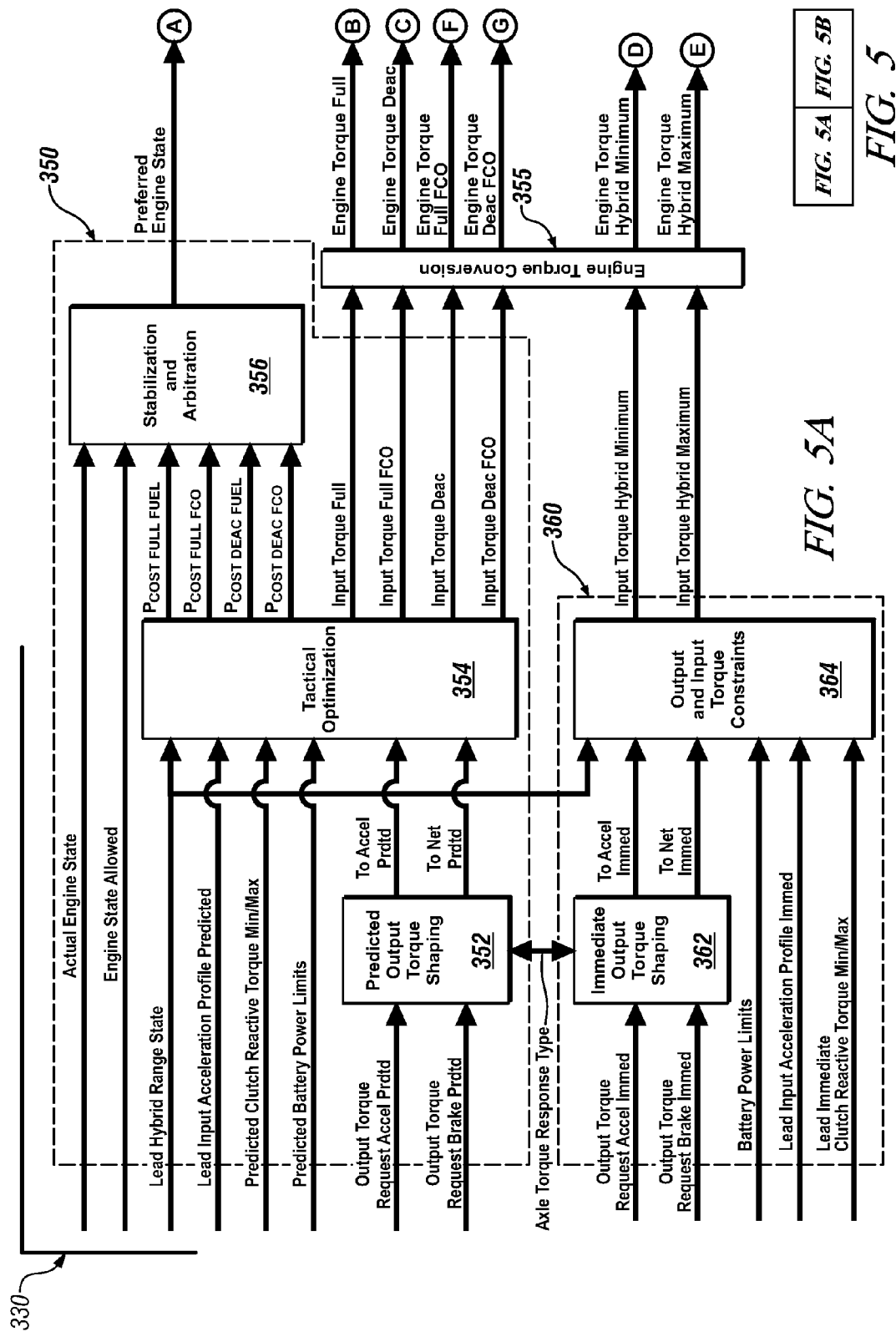
FIG. 5 is a graphical representation depicting operating ranges of an energy storage device, in accordance with an exemplary embodiment of the present disclosure.
Figure 5B:
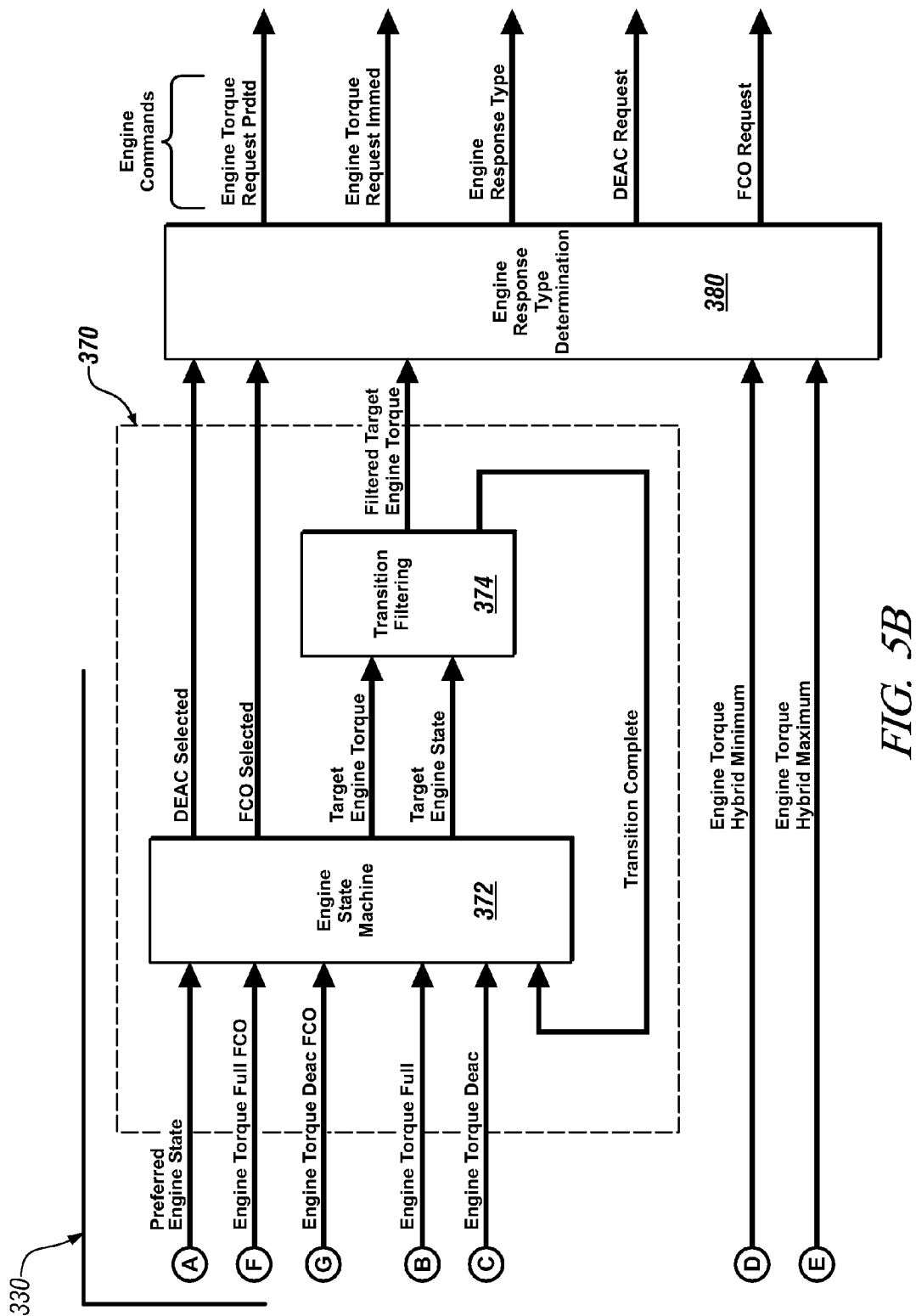

FIG. 5 details signal flow in the tactical control scheme ('Tactical Control and Operation') 330 for controlling operation of the engine 14, described with reference to the hybrid powertrain system of FIGS. 1 and 2 and the control system architecture of FIGS. 3 and 4. The tactical control scheme 330 includes a tactical optimization control path 350 and a system constraints control path 360 which are preferably executed concurrently. The outputs of the tactical optimization control path 350 are input to an engine state control scheme 370. The outputs of the engine state control scheme 370 and the system constraints control path 360 are input to an engine response type determination scheme ('Engine Response Type Determination') 380 for controlling the engine state, the immediate engine torque request, the predicted engine torque request, and the engine response type.

The input from the engine 14 can be described in terms of an engine operating point including engine speed and engine torque which can be converted into the input speed and input torque which react with the input member from the transmission 10. When the engine 14 comprises a spark-ignition engine, a change in the engine operating point can be effected by changing mass of intake air to the engine 14, by controlling position of an engine throttle (not shown) utilizing an electronic throttle control system (not shown), including opening the engine throttle to increase engine torque and closing the engine throttle to decrease engine torque. Changes in the engine operating point can be effected by adjusting ignition timing, including retarding spark timing from a mean-best-torque spark timing to decrease engine torque. When the engine 14 comprises a compression-ignition engine, the engine operating point is controlled by controlling the mass of injected fuel and adjusted by retarding injection timing from a mean-best-torque injection timing to decrease the engine torque. The engine operating point can also be changed to effect a change in the input torque by controlling the engine state between the all-cylinder state and the cylinder deactivation state, and, by controlling the engine state between the engine-fueled state and the fuel cutoff state wherein the engine is rotating and unfueled.

The tactical optimization control path 350 acts on substantially steady-state inputs to select a preferred engine state and to determine a preferred input torque from the engine 14 to the transmission 10. The tactical optimization control path 350 includes an optimization scheme ('Tactical Optimization') 354 to determine preferred input torques for operating the engine 14 in the all-cylinder state ('Input Torque Full'), in the cylinder deactivation state ('Input Torque Deac'), the all-cylinder state with fuel cutoff ('Input Torque Full FCO'), in the cylinder deactivation state with fuel cutoff ('Input Torque Deac FCO'), and a preferred engine state ('Preferred Engine State'). Inputs to the optimization scheme 354 include a lead operating range state of the transmission 10 ('Lead Hybrid Range State') a lead predicted input acceleration profile ('Lead Input Acceleration Profile Predicted') and a predicted range of clutch reactive torques ('Predicted Clutch Reactive Torque Min/Max') across each applied clutch in the lead operating range state, which are preferably generated in the shift execution and engine start/stop control scheme 320. Further inputs include predicted electric power limits ('Predicted Battery Power Limits'), a predicted accelerator output torque request ('Output Torque Request Accel Prdtd') and a predicted brake output torque request ('Output Torque Request Brake Prdtd'). The predicted output torque request for acceleration is shaped through a predicted output torque shaping filter 352 while considering the axle torque response type to yield a predicted accelerator output torque ('To Accel Prdtd') and combined with the predicted output torque request for braking to determine the net predicted output torque ('To Net Prdtd'), which are inputs to the optimization scheme 354. The lead operating range state of the transmission 10 comprises a time-shifted lead of the operating range state of the transmission 10 to accommodate a response time lag between a commanded change in the operating range state and the actual operating range state. Thus the lead operating range state of the transmission 10 is the commanded operating range state. The lead predicted input acceleration profile comprises a time-shifted lead of the predicted input acceleration profile of the input member 12 to accommodate a response time lag between a commanded change in the predicted input acceleration profile and a measured change in the predicted input acceleration profile. Thus the lead predicted input acceleration profile is the predicted input acceleration profile of the input member 12 occurring after the time shift. The parameters designated as 'lead' are used to accommodate concurrent transfer of torque through the powertrain converging at the common output member 64 using devices having varying response times. Specifically, the engine 14 can have a response time of an order of magnitude of 300-600 ms, and each of the torque transfer clutches C1 70, C2 62, C3 73, and C4 75 can have response times of an order of magnitude of 150-300 ms, and the first and second electric machines 56 and 72 can have response time of an order of magnitude of 10 ms.

The optimization scheme 354 determines costs for operating the engine 14 in the engine states, which comprise operating the engine fueled and in the all-cylinder state ('$P_{COST\ FULL\ FUEL}$'), operating the engine unfueled and in the all-cylinder state ('$P_{COST\ FULL\ FCO}$'), operating the engine fueled and in cylinder deactivation state ('$P_{COST\ DEAC\ FUEL}$'), and operating the engine unfueled and in the cylinder deactivation state ('$P_{COST\ DEAC\ FCO}$'). The aforementioned costs for operating the engine 14 are input to a stabilization analysis scheme ('Stabilization and Arbitration') 356 along with the actual engine state ('Actual Engine State') and allowable or permissible engine state(s) ('Engine State Allowed') to select one of the engine states as the preferred engine state ('Preferred Engine State').

The preferred input torques for operating the engine 14 in the all-cylinder state and in the cylinder deactivation state with and without fuel cutoff are input to an engine torque conversion calculator 355 and converted to preferred engine torques in the all-cylinder state and in the cylinder deactivation state ('Engine Torque Full' and 'Engine Torque Deac') and with fuel cutoff in the all-cylinder state and in the cylinder deactivation state ('Engine Torque Full FCO' and 'Engine Torque Deac FCO') respectively, by taking into account torque-consuming components, e.g., a hydraulic pump, between the engine 14 and the transmission 10. The preferred engine torques and the preferred engine state comprise inputs to the engine state control scheme 370.

The costs for operating the engine 14 include operating costs which are determined based upon factors that include vehicle driveability, fuel economy, emissions, and battery usage. Costs are assigned and associated with fuel and electrical power consumption and are associated with specific operating conditions of the hybrid powertrain. Lower operating costs can be associated with lower fuel consumption at high conversion efficiencies, lower battery power usage and lower emissions and take into account the present operating state of the engine 14.

The preferred engine state and the preferred engine torques in the all-cylinder state and in the cylinder deactivation state are input to the engine state control scheme 370, which includes an engine state machine ('Engine State Machine') 372. The engine state machine 372 determines a target engine torque ('Target Engine Torque') and an engine state ('Target Engine State') based upon the preferred engine torques and the preferred engine state. The target engine torque and the engine state are input to a transition filter 374 which filters the target engine torque to provide a filtered target engine torque ('Filtered Target Engine Torque') and which enables transitions between engine states. The engine state machine 372 outputs a command that indicates selection of one of the cylinder deactivation state and the all-cylinder state ('DEAC Selected') and indicates selection of one of the engine-fueled state and the deceleration fuel cutoff state ('FCO Selected').

The selection of one of the cylinder deactivation state and the all-cylinder state and the selection of one of the engine-fueled state and the deceleration fuel cutoff state, the filtered target engine torque, and the minimum and maximum engine torques are input to the engine response type determination scheme 380.

The system constraints control path 360 determines the constraints on the input torque, comprising minimum and maximum input torques ('Input Torque Hybrid Minimum' and 'Input Torque Hybrid Maximum') that can be reacted by the transmission 10. The minimum and maximum input torques are determined based upon constraints to the transmission 10, the first and second electric machines 56 and 72, and the ESD 74, which affect the capacity of the transmission 10 and the electric machines 56 and 72.

Inputs to the system constraints control path 360 include the immediate output torque request as measured by the accelerator pedal 113 combined with the torque intervention control ('Output Torque Request Accel Immed') and the immediate output torque request as measured by the brake pedal 112 combined with the torque intervention control ('Output Torque Request Brake Immed'). The immediate output torque request is shaped through an immediate output torque shaping filter 362 while considering the axle torque response type to yield an immediate accelerator output torque ('To Accel Immed') and is combined with the immediate output torque request for braking to determine the net immediate output torque ('To Net Immed'). The net immediate output torque and the immediate accelerator output torque are inputs to a constraints scheme ('Output and Input Torque Constraints') 364. Other inputs to the constraints scheme 364 include the lead operating range state of the transmission 10, an immediate lead input acceleration profile ('Lead Input Acceleration Profile Immed'), a lead immediate clutch reactive torque range ('Lead Immediate Clutch Reactive Torque Min/Max') for each applied clutch in the lead operating range state, and the tactical control electric power constraints ('Tactical Control Electric Power Constraints') comprising the range from the minimum tactical control electric power constraint $P_{BAT\_MIN\_TC}$ to the maximum tactical control electric power constraint $P_{BAT\_MAX\_TC}$. The tactical control electric power constraints are outputted from a battery power function ('Battery Power Control') 366. A targeted lead input acceleration profile comprises a time-shifted lead of the immediate input acceleration profile of the input member 12 to accommodate a response time lag between a commanded change in the immediate input acceleration profile and a measured change in the immediate input acceleration profile. The lead immediate clutch reactive torque range comprises a time-shifted lead of the immediate clutch reactive torque range of the clutches to accommodate a response time lag between a commanded change in the immediate clutch torque range and a measured change in the immediate clutch reactive torque range. The constraints scheme 364 determines an output torque range for the transmission 10, and then determines the minimum and maximum input torques that can be reacted by the transmission 10 based upon the aforementioned inputs.

Further, the constraints scheme 364 inputs an immediate engine torque request and outputs an immediate electric power $P_{BATT\_IMMED}$ that is an estimated battery output power of the ESD 74 when the engine 14 is operating at the immediate engine torque and when the electric machines 56, 72 are operating at preferred motor torques based upon the operator torque request and the other inputs of the constraints scheme 364.

The minimum and maximum input torques are input to the engine torque conversion calculator 355 and converted to minimum and maximum engine torques ('Engine Torque Hybrid Minimum' and 'Engine Torque Hybrid Maximum' respectively), by taking into account torque-consuming components, e.g., a hydraulic pump, parasitic and other loads introduced between the engine 14 and the transmission 10.

The filtered target engine torque, the output of the engine state machine 372 and the minimum and maximum engine torques are input to the engine response type determination scheme 380. The engine response type determination scheme 380 limits the filtered target engine torque to the minimum and maximum hybrid engine torques and outputs the engine commands to the ECM 23 for controlling the engine torques to an immediate engine torque request ('Engine Torque Request Immed') and a predicted engine torque request ('Engine Torque Request Prdtd'). Other commands control the engine state to one of the engine fueled state and the fuel cutoff state ('FCO Request') and to one of the cylinder deactivation state and the all-cylinder state ('DEAC Request'). Another output comprises an engine response type ('Engine Response Type'). When the filtered target engine torque is within the range between the minimum and maximum engine torques, the engine response type is inactive. When the filtered target engine torque drops below the maximum constraint of the engine torque ('Engine Torque Hybrid Maximum') the engine response type is active, indicating a need for an immediate change in the engine torque, e.g., through engine spark control to change the engine torque to fall within the constraints of the minimum and maximum engine torques.

Figure 6:
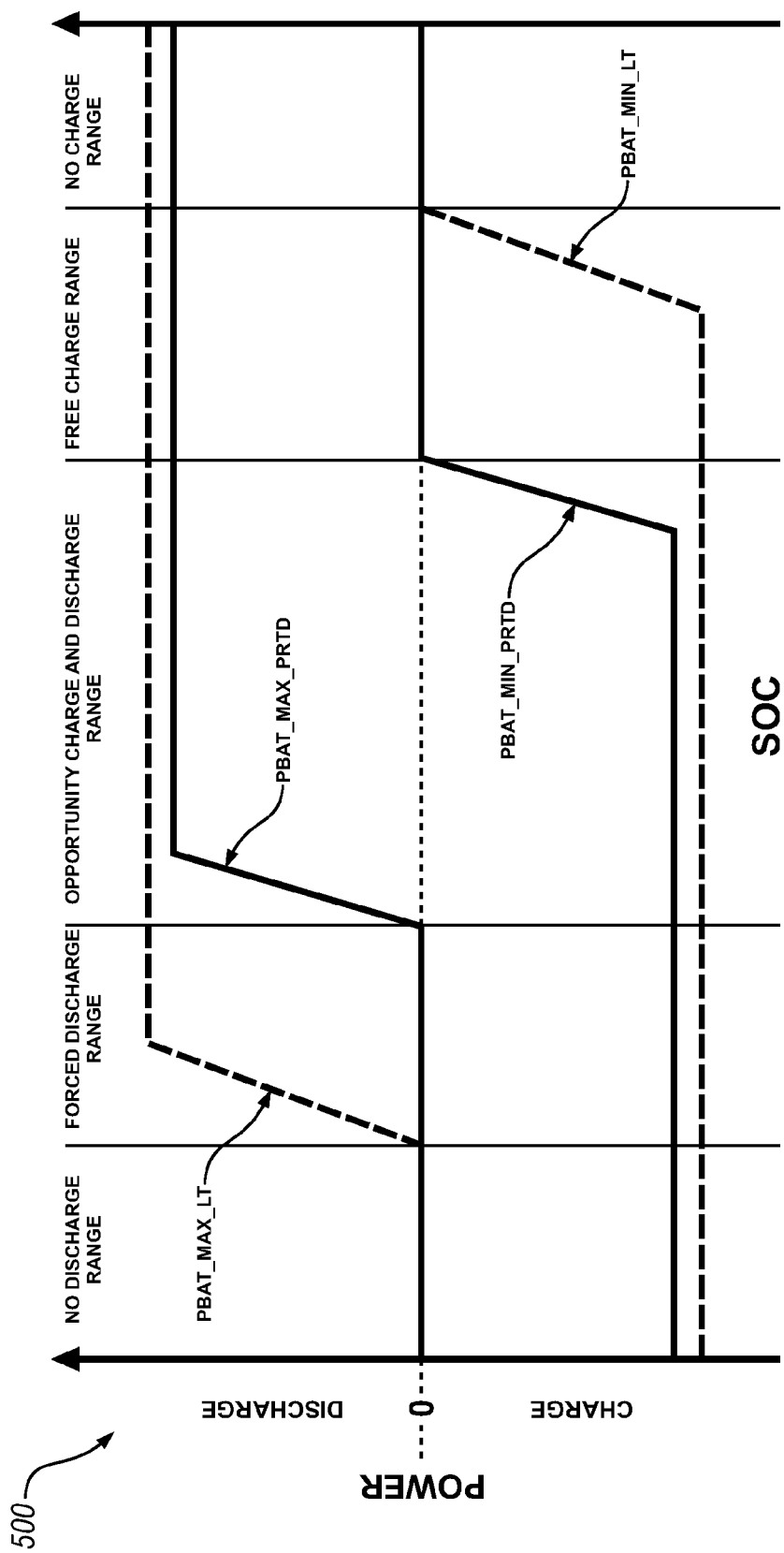
FIGS. 6-9 are graphical representations depicting torque levels within a powertrain system and output powers of an energy storage device in accordance with exemplary embodiments of the present disclosure.

FIGS. 6-9 show a method for controlling the input torque $T_I$ based on a state-of-charge range. FIG. 6 shows a graph 500 depicting output power of the ESD 74 ('POWER') on the y-axis and state-of-charge of the ESD 74 ('SOC') on the x-axis. The control system determines whether to operate the powertrain to charge the ESD 74 ('CHARGE') thereby operating the ESD 74 at negative output power levels, whether to operate the powertrain to discharge the ESD 74 ('DIS- CHARGE') thereby operating the ESD 74 at positive output power levels, or whether to operate the ESD 74 at zero output power ('0') thereby neither charging nor discharging the ESD 74 based upon the long-term electric power limits and the predicted electric power limits. The long-term electric power limits and the predicted electric power limits are determined based upon the state-of-charge of the ESD 74. Therefore, the state-of-charge of the ESD 74 defines operating ranges based upon functionality of the ESD 74 including a no discharge range 'NO DISCHARGE RANGE,' a forced discharge range 'FORCED DISCHARGE RANGE,' an opportunity charge and discharge range 'OPPORTUNITY CHARGE AND DISCHARGE RANGE,' a free charge range 'FREE CHARGE RANGE,' and a no charge range 'NO CHARGE RANGE.'

The predicted electric power limits define a range of power utilized in optimization functions. The optimization functions can determine preferred powertrain system operating points based on power costs of operating the powertrain system. The preferred powertrain system operating points can include, for example, the preferred engine operating point or the preferred operating range state of the transmission 10. Providing predicted electric power limits that define a more constrained ESD 74 output power operating range than the long-term electric power limits, determining the preferred powertrain operating point utilizing the predicted electric power limits, and the output torque command of the transmission 10 utilizing the long-term electric power limits provides the forced discharge range and the free charge range, as described below.

The no discharge range comprises the state-of-charge range in which the maximum long-term electric power limit value is less than or equal to zero. When the state-of-charge of the ESD 74 is within the no discharge range, the ESD 74 is controlled to output either negative or zero output power values, and therefore, the ESD 74 is controlled to restrict discharging.

The forced discharge range comprises the state-of-charge range in which the maximum long-term electric power limit value is greater than zero, and the maximum predicted electric power limit is less than or equal to zero. When the state-of-charge of the ESD 74 is within the forced discharge range, optimization functions of the strategic control scheme 310 and the tactical control scheme 330 restrict discharging when determining the preferred powertrain system operating point. However, the output and motor torque determination scheme 340 may command discharging of the ESD 74 to meet the operator torque request. For example, the ESD 74 may be controlled to discharge to meet a changing operator output torque request exceeding the capability of the engine during a wide-open pedal maneuver. Thus, the output and motor torque determination scheme 340 can command discharging of the ESD 74 to positively affect the output torque $T_O$ to meet the operator torque request. Since the preferred powertrain operating point is determined while excluding ESD 74 discharging considerations, the preferred input torque from the engine 14 is not determined based upon conserving fuel by supplementing the input torque $T_I$ with motor torques $T_A$ and $T_B$ from the first and second electric machines 56 and 72 to meet the operator torque request $T_{O\_REQ}$.

The opportunity charge and discharge range comprises the state-of-charge range in which the maximum predicted electric power limit is greater than or equal to zero and the minimum predicted electric power limit is less than or equal to zero. When the ESD 74 state-of-charge is in the opportunity charge and discharge range, the optimization functions consider both charging and discharging of the ESD 74 when determining the preferred powertrain system operating point based on power costs.

The free charge range comprises the state-of-charge range in which the minimum long-term electric power limit value is less than or equal to zero, and the minimum predicted electric power limit is greater than or equal to zero. When the state-of-charge of the ESD 74 is within the free charge range, optimization functions of the strategic control scheme 310 and the tactical control scheme 330 restrict charging when determining the preferred powertrain system operating point. However, the output and motor torque control scheme 340 may command charging of the ESD 74 to meet the operator torque request. For example, the ESD 74 may be controlled to charge when the optimization function determines that the engine 14 will consume less fuel when operating at higher engine torques (for example, when operating at wide open throttle) than when operating at lower engine torques. Since the preferred powertrain system operating point is determined based on excluding ESD 74 charging considerations, the preferred engine torque is not determined based upon consuming additional fuel to charge the ESD 74 when the optimization function determines that consuming additional fuel is more energy efficient. However, the ESD 74 can be controlled to capture energy that would otherwise be dissipated, for example through blended braking. Therefore, the ESD 74 will charge when charging is "free", that is, when no additional fuel is consumed by charging.

The no charge range comprises the state-of-charge range in which the minimum long-term electric power limit value is greater than or equal to zero. When the state-of-charge of the ESD 74 is within the no charge range, the ESD 74 is controlled to output either positive or zero output power values, and therefore, the ESD 74 is controlled to restrict charging.

Figure 7A:
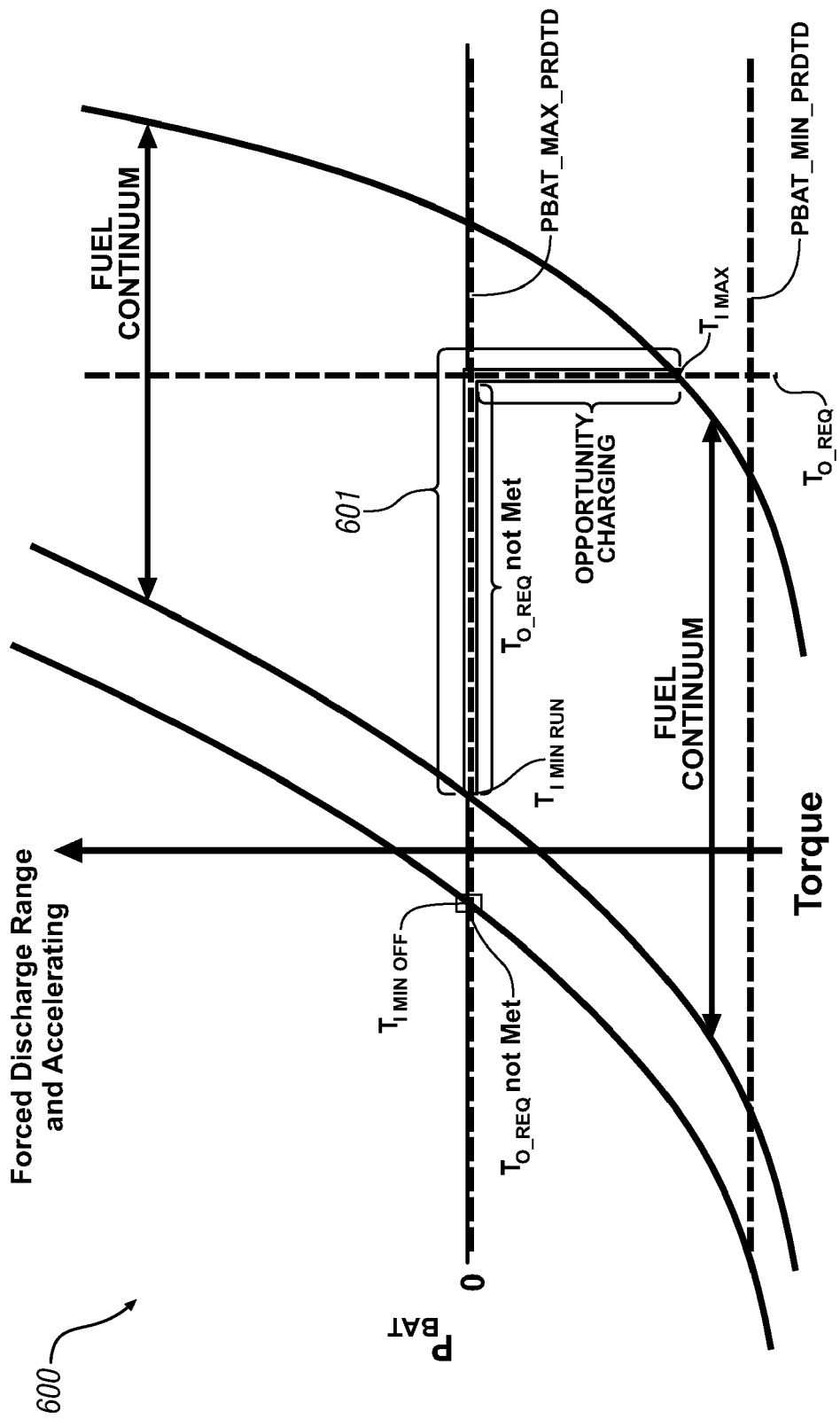

FIG. 7A shows a graph 600 depicting torque levels ('Torque') of the powertrain system on the x-axis and output power levels of the ESD 74 ('$P_{BAT}$') on the y-axis when the ESD 74 is operating in the forced discharge range, i.e., when the ESD 74 is at a nominally low state-of-charge, and when the powertrain system is accelerating ('Forced Discharge Range and Accelerating'). The graph 600 includes a search range 601 from a minimum engine run input torque ('$T_{I\ MIN\ RUN}$') to a maximum input torque ('$T_{I\ MAX}$'). The optimization functions determines a preferred input torque either at the engine off input torque $T_{I\ MIN\ OFF}$ or an input torque within the search range 601.

As the input torque $T_I$ from the engine 14 increases, an amount of fuel consumed by the engine 14 increases as represented by the fuel continuum ('Fuel Continuum'). The optimization functions search input torques and calculate corresponding motor torques $T_A$, $T_B$ from the first and second electric machines 56 and 72 based on the operator torque request $T_{O\_REQ}$, wherein the maximum and minimum corresponding motor torques are bound by the maximum predicted electric power limit ('$P_{BAT\_MAX\_PRDTD}$') and the minimum predicted electric power limit ('$P_{BAT\_MIN\_PRDTD}$'), which allow charging but restrict discharging of the ESD 74. The optimization functions determine penalty costs for input torques within the search range 601 that do not meet the operator torque request in combination with the motor torques $T_A$ and $T_B$ ('$T_{O\_REQ}$ not Met'). The optimization functions further determines penalty costs for the minimum engine off input torque $T_{I\ MIN\ OFF}$ that does not meet the operator torque request ('$T_{O\_REQ}$ not Met').

Figure 7B:
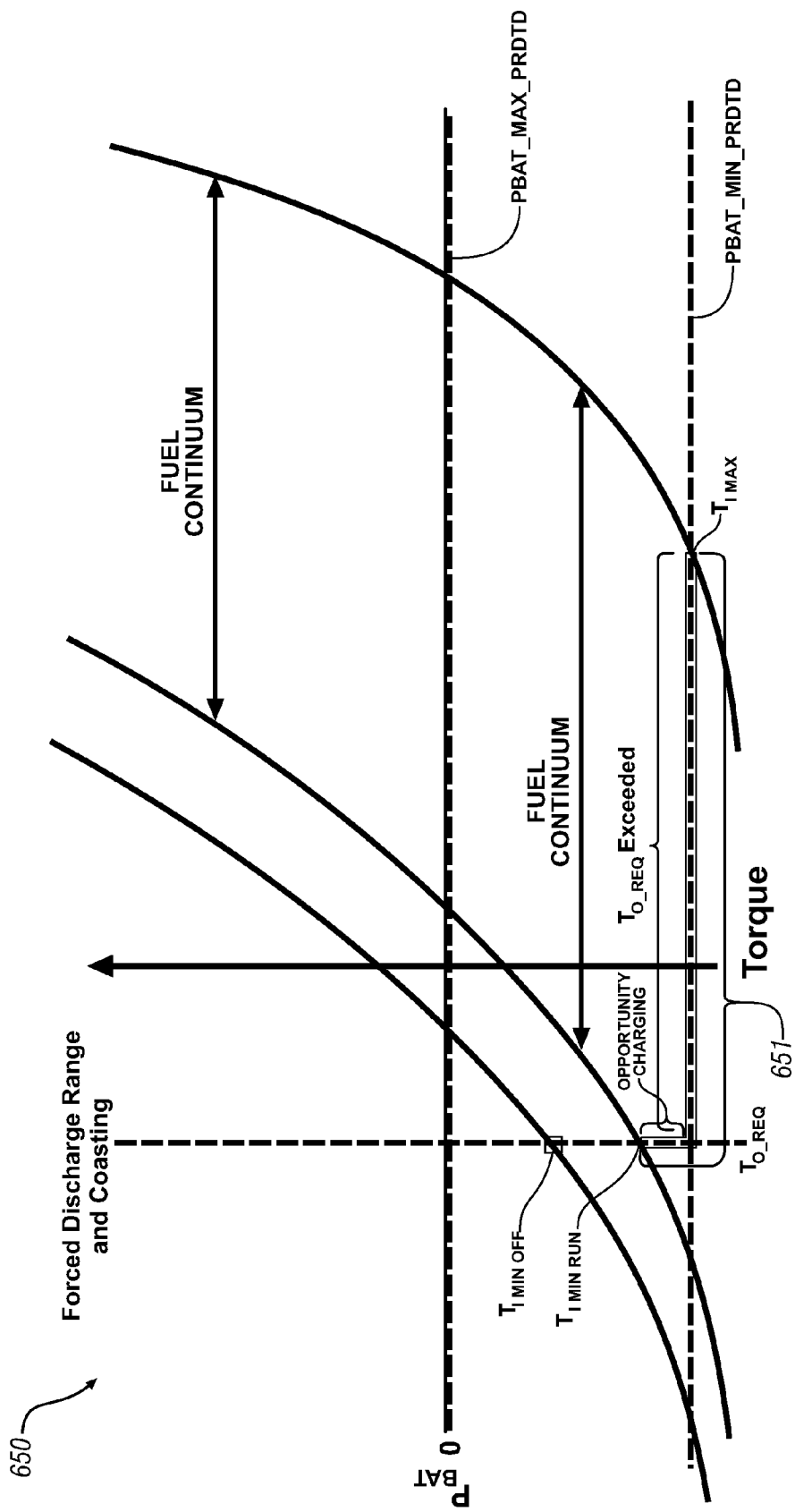

FIG. 7B shows a graph 650 depicting torque levels ('Torque') on the x-axis and output power levels of the ESD 74 ('$P_{BAT}$') on the y-axis when the ESD 74 is operating in the forced discharge range, i.e., when the ESD 74 is at a nominally low state-of-charge, and when the powertrain system is coasting ('Forced Discharge Range and Coasting'). The graph 650 includes a search range 651 between the minimum engine run input torque ('$T_{I\_MIN\_RUN}$') and the maximum input torque ('$T_{I\_MAX}$'). The optimization functions determine a preferred input torque either at the engine off input torque ('$T_{I\_MIN\_OFF}$') or at an input torque within the search range 651.

As the input torque $T_I$ from the engine 14 increases, the amount of fuel consumed by the engine 14 increases as represented by the fuel continuum ('Fuel Continuum'). The optimization functions search input torques $T_I$ and calculate corresponding motor torques $T_A$, $T_B$ input from the first and second electric machines 56 and 72 based on the operator torque request $T_{O\_REQ}$, wherein the minimum corresponding motor torques are bound by the maximum predicted electric power limit ('$P_{BAT\_MAX\_PRDTD}$') and the minimum predicted electric power limit ('$P_{BAT\_MIN\_PRDTD}$'), which provides a power range that allows charging but disallows discharging of the ESD 74 ('OPPORTUNITY CHARGING'). The optimization functions determine penalty costs for input torques within the search range 601 that, in combination with permissible motor torques $T_A$ and $T_B$ exceed the operator torque request ('$T_{O\_REQ}$ Exceeded').

Figure 8A:
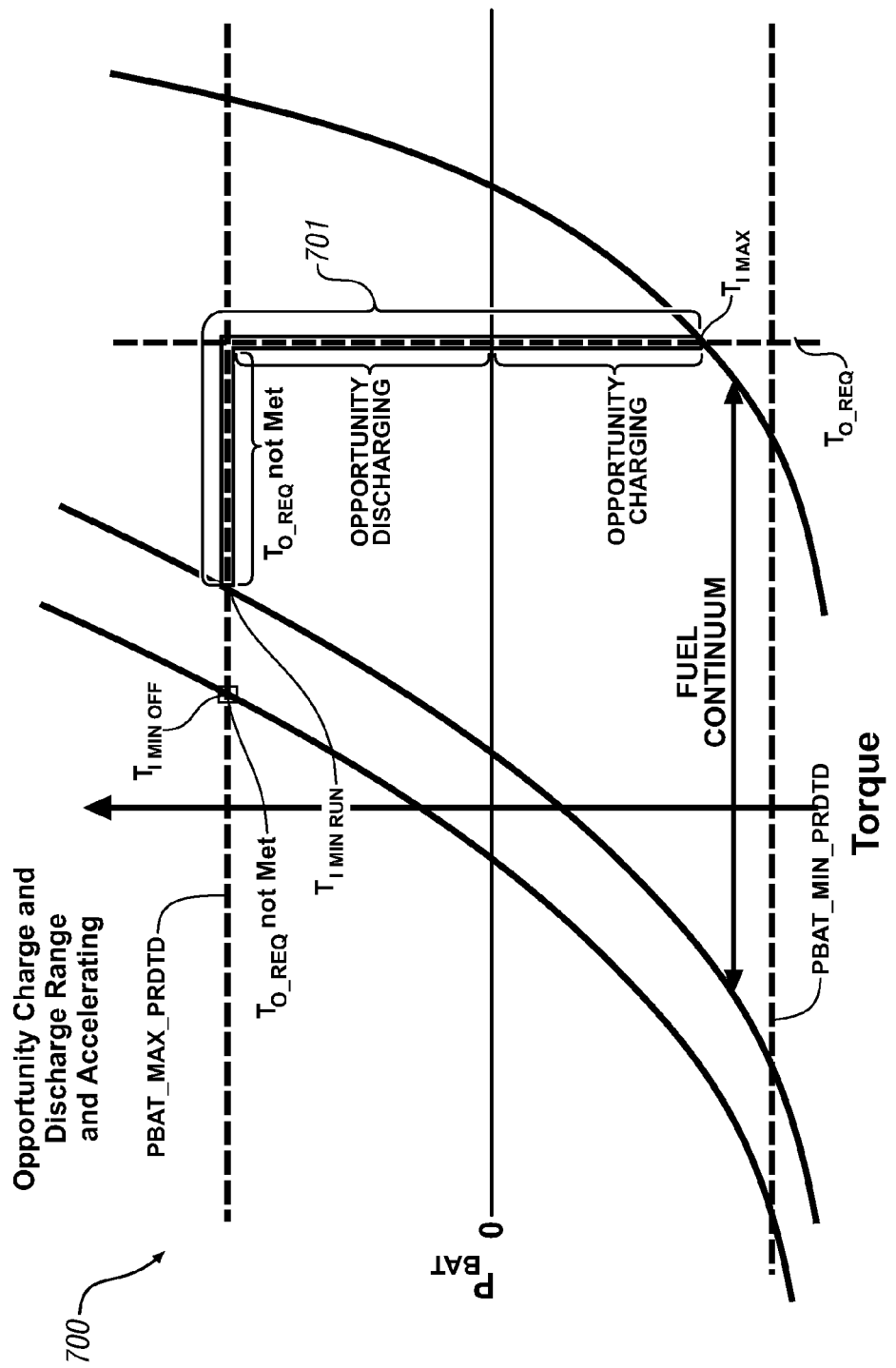

FIG. 8A shows a graph 700 depicting torque levels ('Torque') of the powertrain system on the x-axis and output powers ('$P_{BAT}$') on the y-axis when the ESD 74 is operating in the opportunity charge and discharge range, i.e., when the ESD 74 is at a nominal state-of-charge, and when the powertrain system is accelerating ('Opportunity Charge and Discharge Range and Accelerating'). The graph 700 includes a search range 701 from a minimum engine run input torque ('$T_{I\_MIN\_RUN}$') to a maximum input torque ('$T_{I\_MAX}$'). The optimization functions determine a preferred input torque either at the engine off input torque $T_{I\_MIN\_OFF}$ or at an input torque within the search range 701.

As the input torque $T_I$ from the engine 14 increases an amount of fuel consumed by the engine increases as represented by the fuel continuum ('Fuel Continuum'). The optimization functions search input torques and calculate corresponding motor torques $T_A$, $T_B$ from the first and second electric machines 56 and 72 based on the operator torque request $T_{O\_REQ}$, wherein the minimum corresponding motor torques are bound by the maximum predicted electric power limit ('$P_{BAT\_MAX\_PRDTD}$') and the minimum predicted electric power limit ('$P_{BAT\_MIN\_PRDTD}$'), which allow both charging ('Opportunity Charging') and discharging ('Opportunity Discharging') of the ESD 74. The optimization functions determine penalty costs for input torques within the search range 701 that, in combination with the permissible motor torques $T_A$ and $T_B$ do not meet the operator torque request ('$T_{O\_REQ}$ not Met'). The optimization functions further determine penalty costs for the minimum engine off input torque that, in combination with the permissible motor torques $T_A$ and $T_B$, does not meet the operator torque request ('$T_{O\_REQ}$ not Met').

FIG. 8B shows a graph 750 depicting torque levels ('Torque') on the x-axis and output power levels of the ESD 74 ('$P_{BAT}$') on the y-axis when the ESD 74 is operating in the opportunity charge and discharge range and when the powertrain system is coasting ('Opportunity Charge and Discharge Range and Coasting'). The graph 750 includes a search range 751 from a minimum engine run input torque ('$T_{I\_MIN\_RUN}$') to a maximum input torque ('$T_{I\_MAX}$'). The optimization functions determine a preferred input torque either at the engine off input torque $T_{I\_MIN\_OFF}$ or a search point within the search range 751.

As the input torque $T_I$ from the engine 14 increases, an amount of fuel consumed by the engine increases as represented by the fuel continuum ('Fuel Continuum'). The optimization functions search input torques and calculate corresponding motor torques $T_A$, $T_B$ from the first and second electric machines 56 and 72 based on the operator torque request $T_{O\_REQ}$, wherein the minimum and maximum corresponding motor torques are bound by the maximum predicted electric power limit ('$P_{BAT\_MAX\_PRDTD}$') and the minimum predicted electric power limit ('$P_{BAT\_MIN\_PRDTD}$'), which allows discharging of the ESD 74 ('OPPORTUNITY DISCHARGING'). The optimization functions determine penalty costs for input torques within the search range 601 that, in combination with permissible motor torques $T_A$ and $T_B$ exceed the operator torque request ('$T_{O\_REQ}$ Exceeded).

Figure 9A:
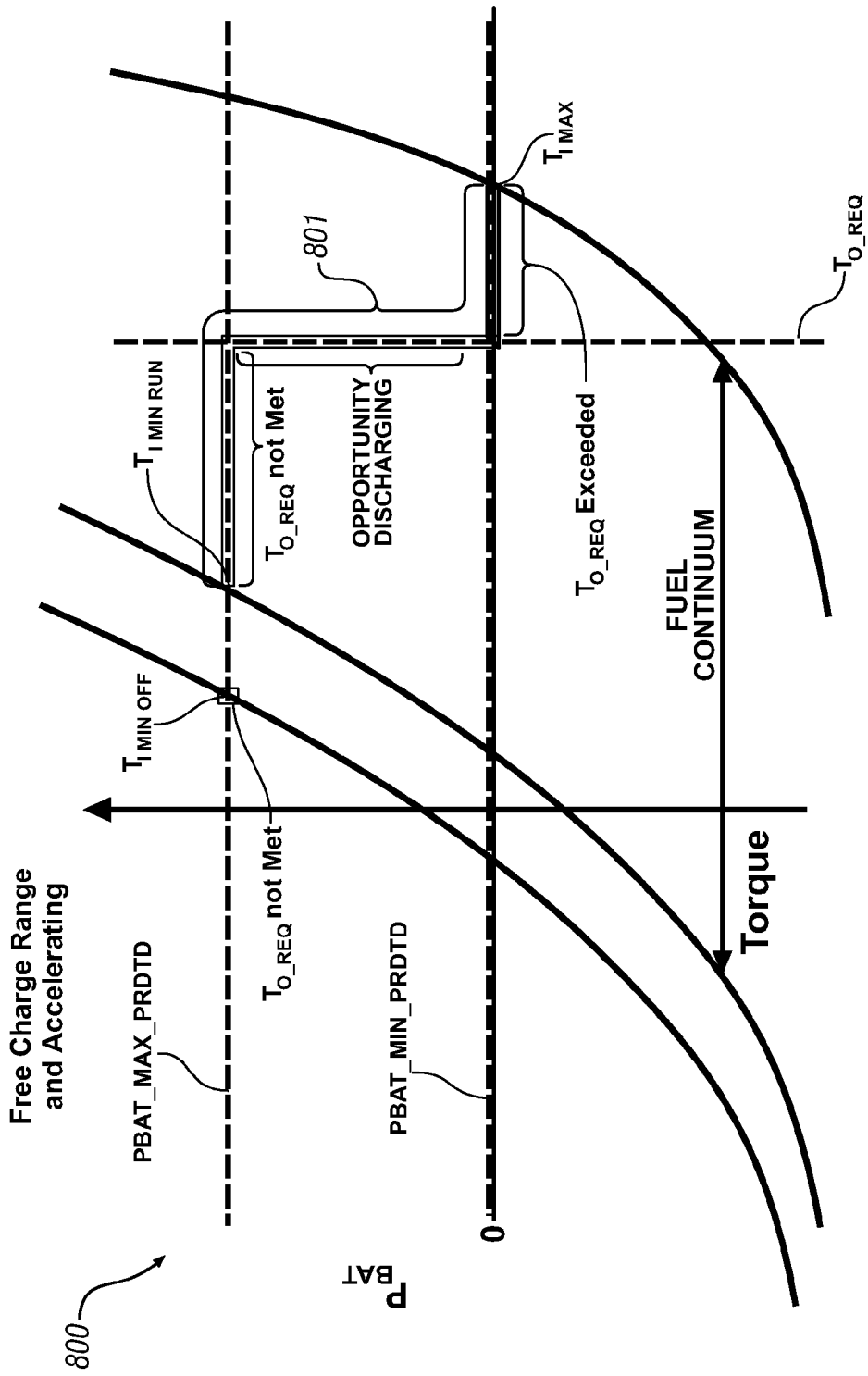

FIG. 9A shows a graph 800 depicting torque levels ('Torque') on the x-axis and output power levels of the ESD 74 ('$P_{BAT}$') on the y-axis when the ESD 74 is operating in the free charge range, corresponding to the ESD 74 at a nominally high state-of-charge, and when the powertrain system is accelerating ('Free Charge Range and Accelerating'). The graph 800 depicts a search range 801 from a minimum engine run input torque ('$T_{I\_MIN\_RUN}$') to a maximum input torque ('$T_{I\_MAX}$'). The optimization functions determines a preferred input torque either at the engine off input torque $T_{I\_MIN\_OFF}$ or at an input torque search point within the search range 801.

As the input torque $T_I$ from the engine 14 increases an amount of fuel consumed by the engine increases as represented by the fuel continuum ('Fuel Continuum'). The optimization functions search input torques and calculate corresponding motor torques $T_A$, $T_B$ from the first and second electric machines 56 and 72 based on the operator torque request $T_{O\_REQ}$, wherein the minimum corresponding motor torques are bound by the maximum predicted electric power limit ('$P_{BAT\_MAX\_PRDTD}$') and the minimum predicted electric power limit ('$P_{BAT\_MIN\_PRDTD}$'), which allow discharging but not charging of the ESD 74 ('OPPORTUNITY DISCHARGING'). The optimization functions determine penalty costs for input torques within the search range 701 that, in combination with the permissible motor torques $T_A$ and $T_B$, do not meet the operator torque request ('$T_{O\_REQ}$ not Met') and exceed the operator torque request ('$T_{O\_REQ}$ Exceed'). The optimization functions further determines penalty costs for the minimum engine off input torque, that in combination with the permissible motor torques $T_A$ and $T_B$, does not meet the operator torque request ('$T_{O\_REQ}$ not Met').

Figure 9B:
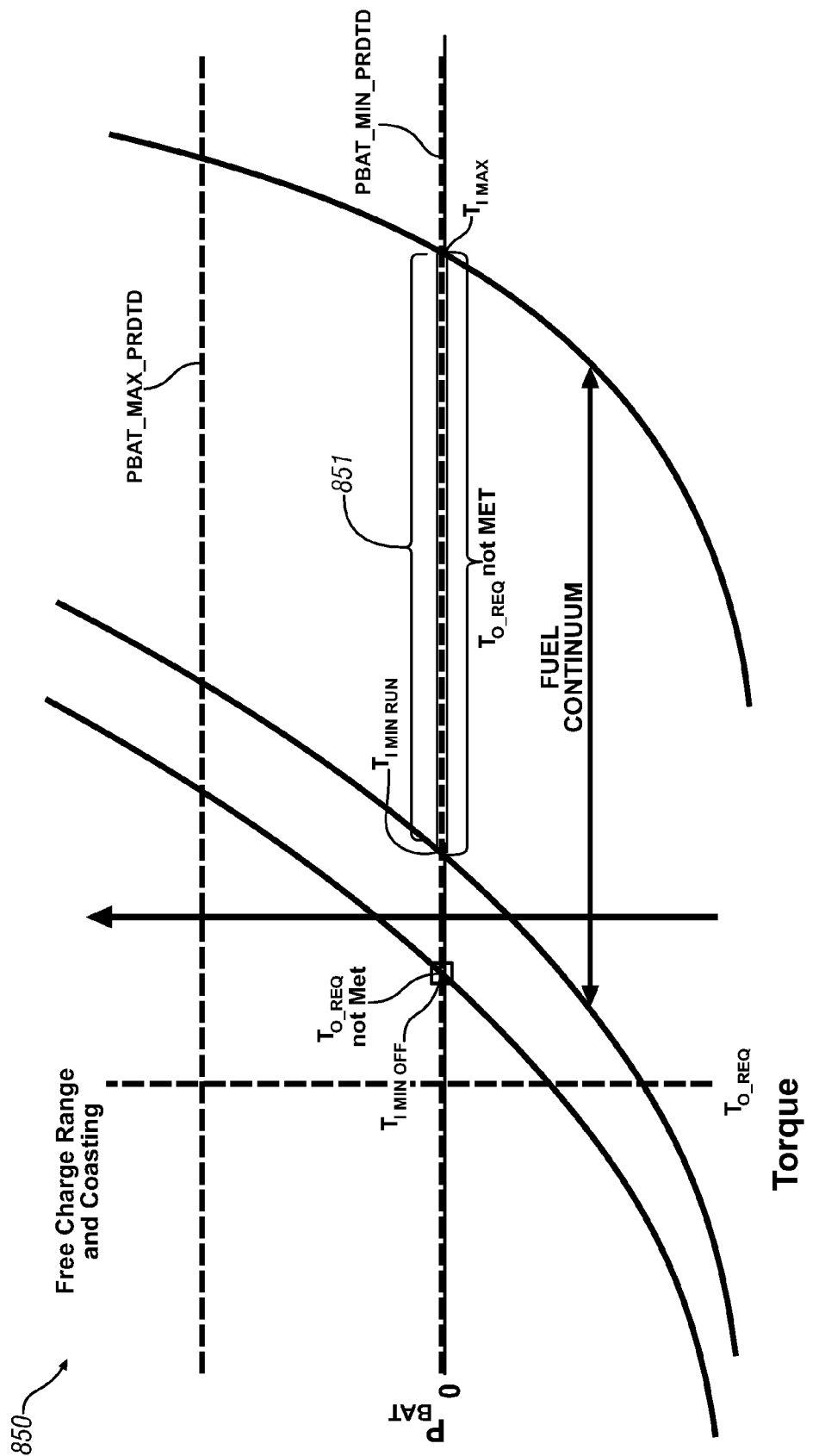

FIG. 9B shows a graph 850 depicting torque levels ('Torque') on the x-axis and output power levels of the ESD 74 ('$P_{BAT}$') on the y-axis when the ESD 74 is operating in the free charge range, i.e., when the ESD 74 is at a nominally high state-of-charge, and when the powertrain system is coasting ('Free Charge Range and Coasting'). The graph 850 depicts a search range 851 from a minimum engine run input torque ('$T_{I\_MIN\_RUN}$') to a maximum input torque ('$T_{I\_MAX}$'). The optimization functions determines a preferred input torque either at the engine off input torque $T_{I\_MIN\_OFF}$ or a search point within the search range 851

As the input torque $T_I$ from the engine 14 increases an amount of fuel consumed by the engine increases as represented by the fuel continuum ('Fuel Continuum'). The optimization functions search input torques and calculates corresponding motor torques $T_A$, $T_B$ from the first and second electric machines 56 and 72 based on the operator torque request $T_{O\_REQ}$, wherein the minimum corresponding motor torques are bound by the maximum predicted electric power limit ('$P_{BAT\_MAX\_PRDTD}$') and the minimum predicted electric power limit ('$P_{BAT\_MIN\_PRDTD}$'), which allow discharging but not charging of the ESD 74. The optimization functions determine penalty costs for input torques within the search range 601 that, in combination with permissible motor torques $T_A$ and $T_B$, exceed the operator torque request ('$T_{O\_REQ}$ Not Met'). The optimization functions further determines penalty costs for the minimum engine off input torque that in combination with permissible motor torques $T_A$ and $T_B$, exceeds the operator torque request ('$T_{O\_REQ}$ Met').

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling a powertrain system comprising an engine, a torque machine, a transmission device and an energy storage device, the transmission device operative to transfer power between the engine, the torque machine and an output member to generate an output torque, the method comprising:
    monitoring an operator torque request;
    monitoring a state-of-charge of the energy storage device;
    determining a first set of maximum and minimum electric power limits and a second set of maximum and minimum electric power limits based on the state-of-charge of the energy storage device;
    providing a first power range corresponding to the first set of maximum and minimum electric power limits;
    providing a second power range corresponding to the second set of maximum and minimum electric power limits;
    identifying a no discharge range and a no charge range between said limits of the second power range;
    identifying an opportunity charge and discharge range between said limits of the first power range;
    identifying a forced discharge range between said maximum limits of the first and the second power ranges;
    identifying a free charge range between said minimum limits of the first and the second power ranges;
    selecting one of the no discharge range, the forced discharge range, the opportunity charge and discharge range, the free charge range, and the no charge range responsive to the state-of-charge of the energy storage device; and
    selecting a preferred input torque from the engine responsive to the operator torque request and limited by the selected one of the no discharge range, the forced discharge range, the opportunity charge and discharge range, the free charge range, and the no charge range.

2. The method of claim 1, further comprising permitting free charging of the energy storage device and restricting opportunity charging of the energy storage device when the state-of-charge is in the free charge range.

3. The method of claim 1, further comprising permitting forced discharging of the energy storage device and restricting opportunity discharging of the energy storage device when the state-of-charge is in the forced discharge range.

4. The method of claim 1, further comprising restricting free charging of the energy storage device and opportunity charging of the energy storage device when the state-of-charge is in the no charge range.

5. The method of claim 1, further comprising restricting forced discharging of the energy storage device and opportunity discharging of the energy storage device when the state-of-charge is in the no discharge range.

6. The method of claim 1, further comprising permitting opportunity charging and opportunity discharging of the energy storage device when the state-of-charge of the energy storage device is in the opportunity charge and discharge range.

7. The method of claim 1, further comprising operating the engine in a cylinder deactivation state when opportunity discharging the energy storage device.

8. The method of claim 1, wherein selecting a preferred input torque from the engine responsive to the operator torque request and limited by the selected one of the no discharge range, the forced discharge range, the opportunity charge and discharge range, the free charge range, and the no charge range comprises:
    providing a search range of engine operating points corresponding to the selected one of the no discharge range, the forced discharge range, the opportunity charge and discharge range, the free charge range, and the no charge range;
    determining costs associated with a plurality of engine operating points within the search range of engine operating points; and
    selecting the preferred engine operating point comprising an engine operating point having a minimum cost within the search range of engine operating points.

9. The method of claim 8 wherein determining costs associated with the plurality of engine operating points within the search range of engine operating points comprises determining costs based upon power loss costs within the powertrain.

10. The method of claim 9, wherein the power loss costs comprise fuel consumption costs.

11. The method of claim 1, wherein the first set of maximum and minimum electric power limits are more constrained than the second set of maximum and minimum electric power limits.

12. Method for controlling a powertrain system comprising an engine, a torque machine, a transmission device and an energy storage device, the transmission device operative to transfer power between the engine, the torque machine and an output member to generate an output torque, the method comprising:
    monitoring a state-of-charge of the energy storage device;
    determining maximum and minimum predicted electric power limits and maximum and minimum long-term electric power limits corresponding to the state-of-charge of the energy storage device;
    identifying a free charge range between the minimum predicted electric power limit and the minimum long-term electric power limit; and
    permitting free charging of the energy storage device and restricting opportunity charging of the energy storage device based on the predicted electric power limits and the long-term electric power limits when the state-of-charge is in the free charge range.

13. The method of claim 12, further comprising determining a preferred engine operating point based upon discharging the energy storage device when the state-of-charge is in the free charge range.

14. The method of claim 13, further comprising controlling output power of the energy storage device to charge the energy storage device when the preferred operating point based upon discharging the energy storage device is determined and when the state-of-charge is in the free charge range.

15. Method for managing electric power in a powertrain system comprising an energy storage device, an engine, a second torque generating device and a transmission device operative to transfer power among an output member, the engine and the second torque generating device, the second torque generating device electrically coupled to an energy storage device, the method comprising:

monitoring a state-of-charge of the energy storage device;

determining maximum and minimum predicted electric power limits and maximum and minimum long-term electric power limits corresponding to the state-of-charge of the energy storage device;

identifying a forced discharge range between the minimum predicted electric power limit and the minimum long-term electric power limit; and permitting forced discharging of the energy storage device and restricting opportunity discharging of the energy storage device utilizing the predicted electric power limits and the long-term electric power limits when the state-of-charge is in the forced discharge range.

16. The method of claim 15, further comprising:

determining a preferred engine operating point based upon charging the energy storage device when the state-of-charge is in the forced discharge range; and controlling output power of the energy storage device to discharge the energy storage device when the preferred operating point based upon charging the energy storage device is determined and when the state-of-charge is in the forced discharge range.

* * * * *